(12) United States Patent
Qian

(10) Patent No.: US 10,068,518 B2
(45) Date of Patent: Sep. 4, 2018

(54) METHOD, APPARATUS AND SYSTEM FOR DITHERING AN IMAGE

(71) Applicant: CANON KABUSHIKI KAISHA, Tokyo (JP)

(72) Inventor: Lena Qunying Ye Qian, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 15/353,052

(22) Filed: Nov. 16, 2016

(65) Prior Publication Data

US 2017/0148371 A1 May 25, 2017

(30) Foreign Application Priority Data

Nov. 23, 2015 (AU) ................. 2015258334

(51) Int. Cl.
  *G09G 3/20* (2006.01)
  *G06T 1/20* (2006.01)
(52) U.S. Cl.
  CPC ............. *G09G 3/2044* (2013.01); *G06T 1/20* (2013.01)
(58) Field of Classification Search
  None
  See application file for complete search history.

(56) References Cited

U.S. PATENT DOCUMENTS

| 8,451,502 B2 | 5/2013 | Guermont |
| 2007/0002410 A1 | 1/2007 | Majewicz |

OTHER PUBLICATIONS

Deshpande, et al., "Hybrid Implementation of Error Diffusion Dithering", IEEE, Proceedings from Proceedings of IEEE International Conference on High Performance Computing, HiPC, Bangalore, India, Dec. 2011, pp. 1-10.

*Primary Examiner* — Michelle Chin
(74) *Attorney, Agent, or Firm* — Canon USA, Inc. I.P. Division

(57) ABSTRACT

A method of dithering pixels of a graphical representation is described, the method comprising the steps of receiving the graphical representation which comprises a plurality of regions each being characterized by an attribute type associated with content of the region; selecting, from a group of processors comprising at least a central processing unit (CPU) and a graphics processing unit (GPU), at least one processor to dither pixels of the regions depending upon corresponding sizes and attribute types of the regions; and dithering pixels of the graphical representation using the selected processor.

20 Claims, 18 Drawing Sheets

METHOD, APPARATUS AND SYSTEM FOR DITHERING AN IMAGE

REFERENCE TO RELATED PATENT APPLICATION(S)

This application claims the benefit under 35 U.S.C. § 119 of the filing date of Australian Patent Application No. 2015258334, filed 23 Nov. 2015, which is hereby incorporated by reference in its entirety as if fully set forth herein.

TECHNICAL FIELD

The present disclosure relates generally to the field of graphics rendering and printing, in particular, to a method, apparatus and system for dithering an image. The present disclosure also relates to a computer program product including a computer readable medium having recorded thereon a computer program for directing a processor to dither an image.

BACKGROUND

The trend of achieving performance speedup through the use of multi-core and multi-processor architectures in computer systems, including printing systems, has gained widespread use in recent years. Multi-core and multi-processor architectures allow a number of computation threads belonging to one or more processes to execute in parallel across a number of cores or processors to reduce the overall execution time.

Modern GPUs (Graphics Processing Units) typically contain hundreds or thousands of simple processing cores, in what is also referred to as a many-core architecture. GPUs are suited to applications and algorithms that can be executed with a large degree of parallelism, requiring little or no communication among parallel threads and minimal branching within a thread's instruction stream. Extracting such a large degree of parallelism from applications originally designed for sequential execution is often difficult, but the potential benefits of GPU processing can be large.

Both multi-core and many-core architectures, which may include one or more CPUs and/or one or more GPUs, coexist in today's computer systems ranging from supercomputers, workstations, home-use desktops to mobile devices. A computer system with different kinds of computational processors such as CPU and GPU is referred to as a "heterogeneous system". A GPU can be implemented on a discrete card or integrated with the CPU on a chip. The ultimate goal of using CPUs and GPUs to run an application in parallel is to achieve maximum performance. However, only some tasks can be executed on GPU effectively. Determining what tasks are more suitable and effective to run on a GPU rather than a CPU can be difficult.

In a print rendering system, a high-level description of a page in the form of a page description language (e.g., PDF or XPS) is received and converted into pixels by a rendering engine for printing. The rendered pixels in RGB colours need to be converted into process colours (for example, CMYK) to be sent to a printer. The PDF interpretation is usually performed by a CPU due to the complexity of the objects described in the page. The rendering task may be executed on the CPU or some parts on the CPU and other parts on a GPU. The colour conversion task (e.g., for non-colourmetric conversions) might perform better if it is performed by the GPU because converting each pixel colour requires simple instructions and it is independent of other pixels. This allows pixel-parallel processing for all pixels in a page or a portion of a page.

The rendered pixels after colour conversion have continuous tone (referred to as "contone") colour components, each of which is typically at least 8 bits per channel. A CMYK colour printer uses three different types of toner, namely cyan, magenta and yellow to create colourful images. An extra channel (black) can be used to print fully black pixels (e.g., for text) and to create very dark colours. A printing device might however have a colour depth of fewer than 8 bits per channel. Modern printing devices can realise more than 1 bit per channel, by having dots varying in size, shape or spacing, thus representing pixels of 2 bits or 4 bits per channel. The process of converting the page pixels in contone colour components into process colour components suitable for printing is called halftoning.

Halftoning can consume significant computing resources because each of the four 8-bit components of every pixel needs to be converted into a smaller number of bits. There are numerous methods of halftoning using sequential algorithms on a CPU to improve halftoning performance in terms of quality and speed, for example, using dither patterns (or matrices), error diffusion and stochastic halftoning. Some known methods use GPUs to halftone the rendered pixels using a dither matrix method or an error diffusion method. A page is sub-divided into tiles, each of which is dithered using a GPU method using dither matrices or error diffusion. In this case, after configuring a number of parallel threads to dither on a GPU, a GPU kernel is launched to start parallel dithering of the pixels in a tile. The CPU is not used at the same time as the GPU dithering process, except for waiting for the result of dithering on the GPU.

Another known error diffusion method combines a CPU dithering method for some portion of the rendered page and a GPU method for another portion in parallel. In error diffusion, the quantization residual of an output colour in a pixel is distributed to its neighbouring pixels that have not yet been processed. For example, one pixel can only be dithered after its left hand pixel, top-left hand pixel, top pixel and top-right hand pixel have been dithered. This data dependency restricts halftoning of the pixels at the top-left hand corner of the image by the sequential method on the CPU. Once the pixels along the diagonal of the corner of the image are halftoned on the CPU, the pixels next to the diagonal can be dithered independently, i.e., they can be dithered in parallel. Some pixels can be processed by a CPU and others by a GPU in parallel. However, selection between the CPU and the GPU is based only on a position of a pixel within the tile, which may not be efficient for some input data.

SUMMARY

It is an object of at least one embodiment of the present disclosure to substantially overcome, or at least ameliorate, one or more issues of existing arrangements.

Disclosed are arrangements, referred to as Hybrid Dithering (HD) arrangements, which seek to maximise dithering performance by choosing an appropriate CPU or GPU processor for tiles with different spatial properties and associated region attributes.

According to a first aspect of the present disclosure, there is provided a method of dithering pixels of a graphical representation, the method comprising the steps of: receiving the graphical representation subdivided into a plurality of portions, each portion comprising a plurality of regions, each region being associated with an attribute type corresponding to content of the region; combining adjacently located regions associated with a same predetermined attribute type within a portion, to form a merged region; comparing a size of the merged region with a threshold for the predetermined attribute type to select a processor for dithering at least the merged region, the processor being selected from a plurality of processors comprising at least a central processing unit and a graphics processing unit; and dithering pixels of the graphical representation using at least the selected processor.

According to another aspect of the present disclosure, there is provided a method of dithering pixels of a graphical representation, the method comprising the steps of: receiving the graphical representation which comprises a plurality of regions each being characterised by an attribute type associated with content of the region; selecting, from a plurality of processors comprising at least a central processing unit (CPU) and a graphics processing unit (GPU), at least one processor to dither pixels of the regions depending upon corresponding sizes and attribute types of the regions; and dithering pixels of the graphical representation using the selected at least one processor.

According to another aspect of the present disclosure, there is provided an apparatus for dithering pixels of a graphical representation, the apparatus comprising: a plurality of processors; and a plurality of memory devices storing a plurality of software programs for directing the processors to perform a method comprising the steps of: receiving the graphical representation which comprises a plurality of regions each being characterised by an attribute type associated with content of the region; selecting, from a plurality of processors comprising at least a central processing unit (CPU) and a graphics processing unit (GPU), at least one processor to dither pixels of the regions depending upon corresponding sizes and attribute types of the regions; and dithering pixels of the graphical representation using the selected at least one processor.

According to another aspect of the present disclosure, there is provided a non-transitory computer readable storage medium storing a plurality of software programs for dithering pixels of a graphical representation by directing a plurality of processors to perform a method comprising the steps of: receiving the graphical representation which comprises a plurality of regions each being characterised by an attribute type associated with content of the region; selecting, from a plurality of processors comprising at least a central processing unit (CPU) and a graphics processing unit (GPU), at least one processor to dither pixels of the regions depending upon corresponding sizes and attribute types of the regions; and dithering pixels of the graphical representation using the selected at least one processor.

Other aspects of the invention are also disclosed.

BRIEF DESCRIPTION OF THE DRAWINGS

At least one embodiment of the invention will now be described with reference to the following drawings, in which.

DETAILED DESCRIPTION INCLUDING BEST MODE

Figure 1:
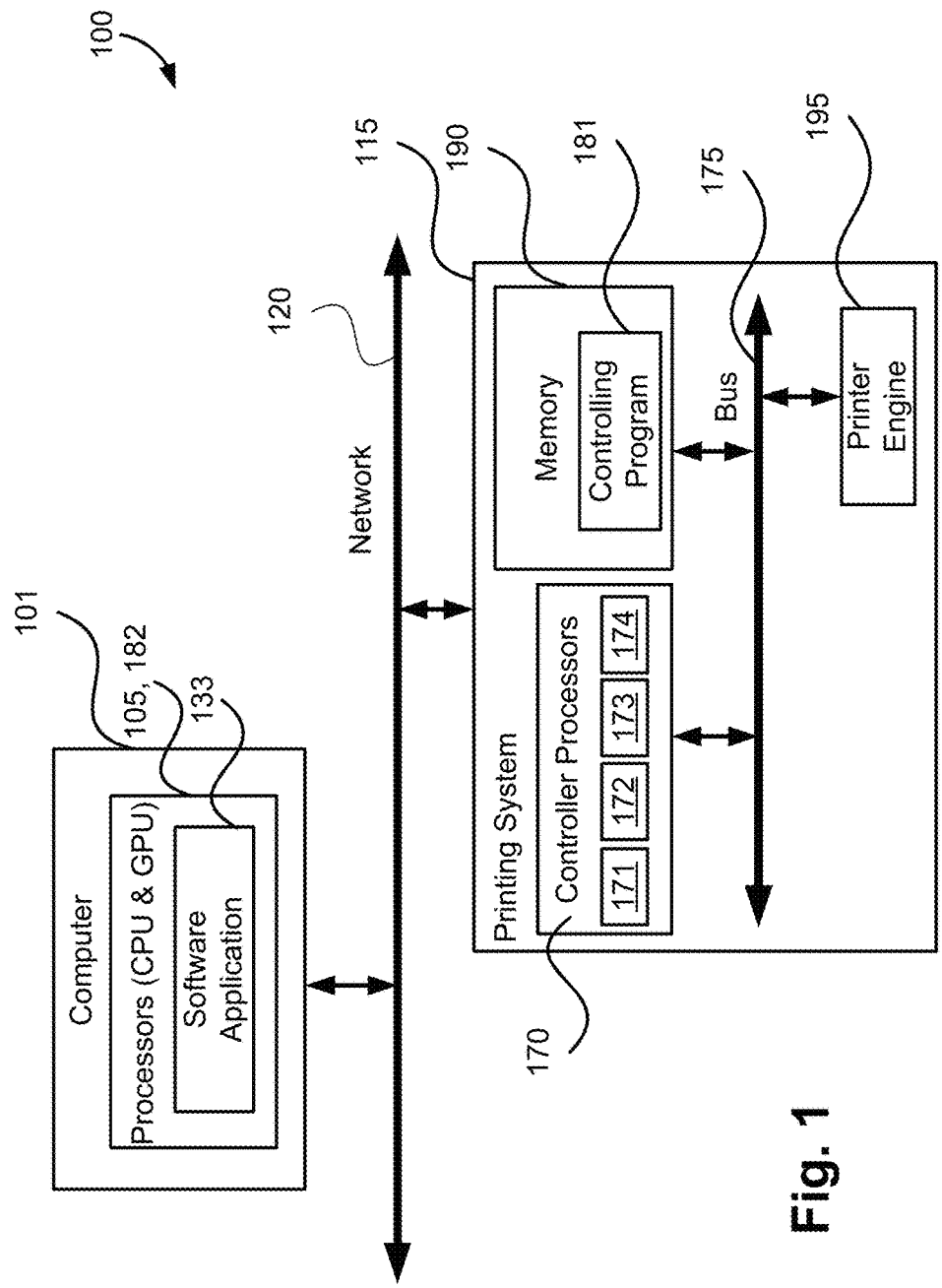
FIG. 1 is a schematic block diagram of a multi-processor printing system for rendering graphic objects of a page.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant(s) that such documents or devices in any way form part of the common general knowledge in the art.

Context

The inventor has realized that a need exists for a more efficient hybrid dithering method that utilises both CPU and GPU in order to achieve the maximum performance of dithering in terms of quality and speed.

FIG. 1 shows a schematic block diagram of a pixel rendering system 100 for rendering graphic objects. The pixel rendering system 100 comprises a computer module 101 connected to a printing system 115 through a communications network 120. The network 120 may be a wide-area network (WAN), such as the Internet, a cellular telecommunications network, a private WAN or a combination of any or all of these. The network 120 may interconnect multiple computers. Alternatively, the network 120 may connect the single computer module 101 and the printing system (e.g., 115). Alternatively, the computer 101 and printing system 115 may be connected by a cable used to communicate between devices, such as a USB, serial, parallel or FireWire cable.

The computer module 101 comprises at least one CPU processor 105 and one GPU processor 182 for executing a software application 133, such as a word processor or graphical software application.

The printing system 115 comprises plurality 170 of controller processors. In the example in FIG. 1, there are four controller processors 171, 172, 173 and 174, for executing one or more software code modules forming a controlling program 181 which is stored in a memory 190. Alternatively, the controller processors 170 may comprise processors that take the form of single-core central processing units (CPUs), GPUs, or any other form of computer processor such as field-programmable gate arrays (FPGAs). In another alternative, the controller processors 170 may comprise a mixture of the various kinds of processors described above. In one implementation of the disclosed HD hybrid dithering arrangements, one of the processors 171-174 is a GPU processor and another is a SIMD stream processor.

The printing system 115 also comprises a printer engine 195 coupled to the controller processors 170, via an interconnecting bus 175. The controlling program 181 accepts a printable page 201 produced by a software application 133 (see FIG. 2) and produces pixel data values 206 for printing. The pixel data values 206 may then be stored in the memory 190 and reproduced as pixels by the printer engine 195, for example. The controlling program 181 may be executed by the controller processors 170 in one or more threads of execution. A thread consists of a number of instructions or steps that are executed in sequence by one of the processors 171-174. The controlling program 181 will be further described in detail below with reference to FIG. 2.

Figure 3A:
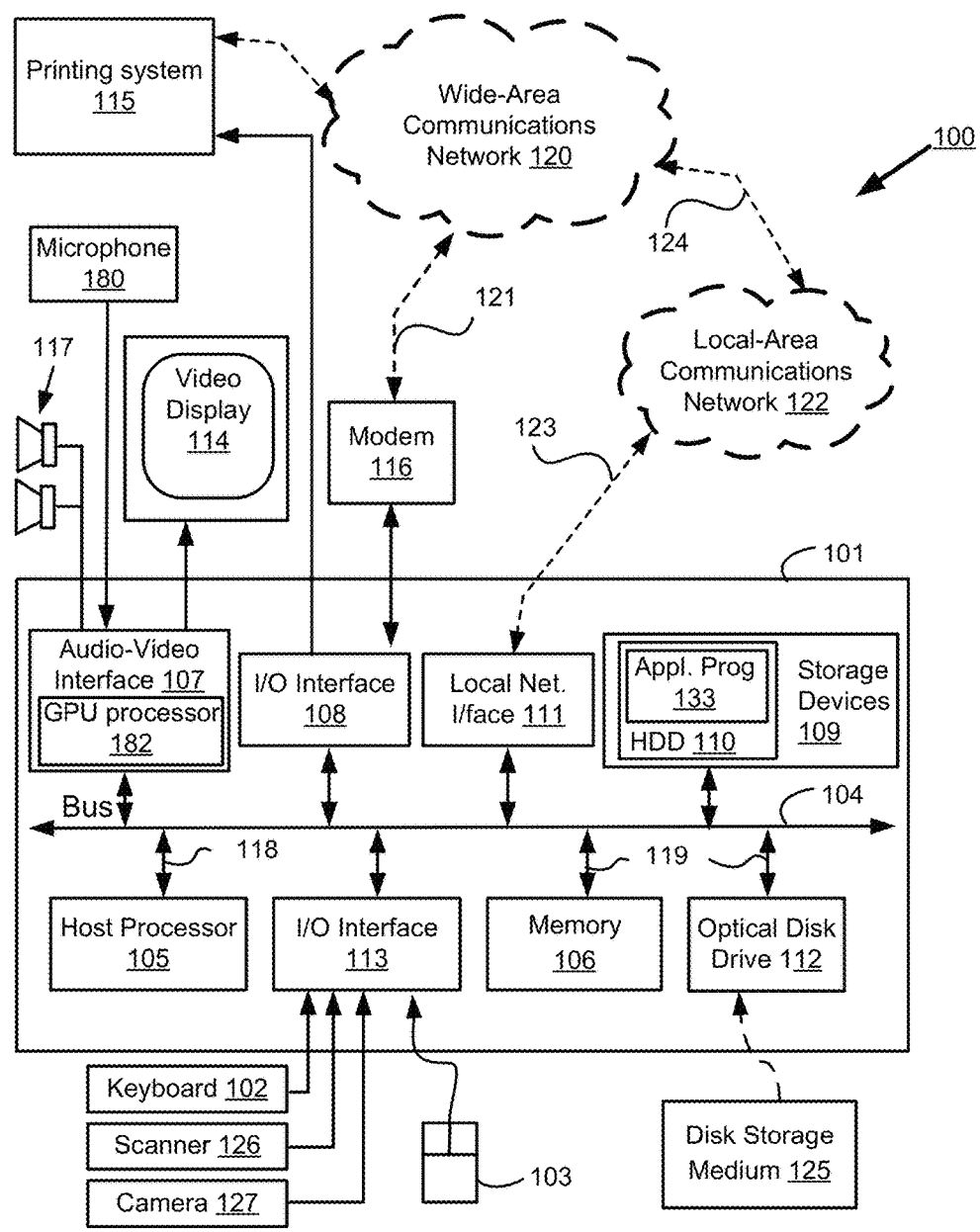
FIGS. 3A and 3B collectively form a schematic block diagram of a general purpose computer system upon which various HD arrangements described can be practiced.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one CPU processor unit 105, at least one GPU processor 182 in a Video Interface 107, and a memory unit 106. For example, the memory unit 106 may have semiconductor random access memory (RAM) and semiconductor read only memory (ROM). The computer module 101 also includes a number of input/output (I/O) interfaces including: the audio-video interface 107 that couples to the video display 114, the loudspeakers 117 and the microphone 180; an I/O interface 113 that couples to the keyboard 102, the mouse 103, the scanner 126, the camera 127 and optionally a joystick or other human interface device (not illustrated); and an interface 108 for the external modem 116 and the printing system 115. In some implementations, the modem 116 may be incorporated within the computer module 101, for example, within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu Ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

HD methods described below may be implemented using the system 100 wherein one or more steps of the processes of FIGS. 2, 4, 5, 11, 15 and 17, to be described, may be implemented as one or more code modules of the software application program 133 (see FIG. 2) and/or the software module 181 executable within the system 100. One or more of the steps of the described HD methods may be effected by instructions 131 (see FIG. 3B) in the software 133 that are carried out within the system 100. The methods shown in FIGS. 2, 4, 5, 11, 15 and 17, may be performed by the processors 105, of which one may be a GPU processor 301. The described HD methods can partially be performed by the processor 105.

As also described below, one or more steps of the processes of FIGS. 2, 4, 5, 11, 15 and 17, to be described, may be implemented as one or more of the code modules forming the controlling program 181 executable within the printing system 115. Again, one or more of the steps of the described methods may be performed on the processors 170, of which one may be a GPU processor 301, by instructions, similar to the instructions 131 in the software 133.

The software instructions implementing the HD software application program and/or the HD controlling program may be formed as the one or more code modules, each for performing one or more particular tasks. The software may also be divided into two separate parts, in which a first part and the corresponding code modules performs the described HD methods and a second part and the corresponding code modules manage a user interface between the first part and the user.

The HD software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described HD methods.

In some instances, the application programs 133 and/or the controlling program 181 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the HD software application program and/or the controlling program and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the HD application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
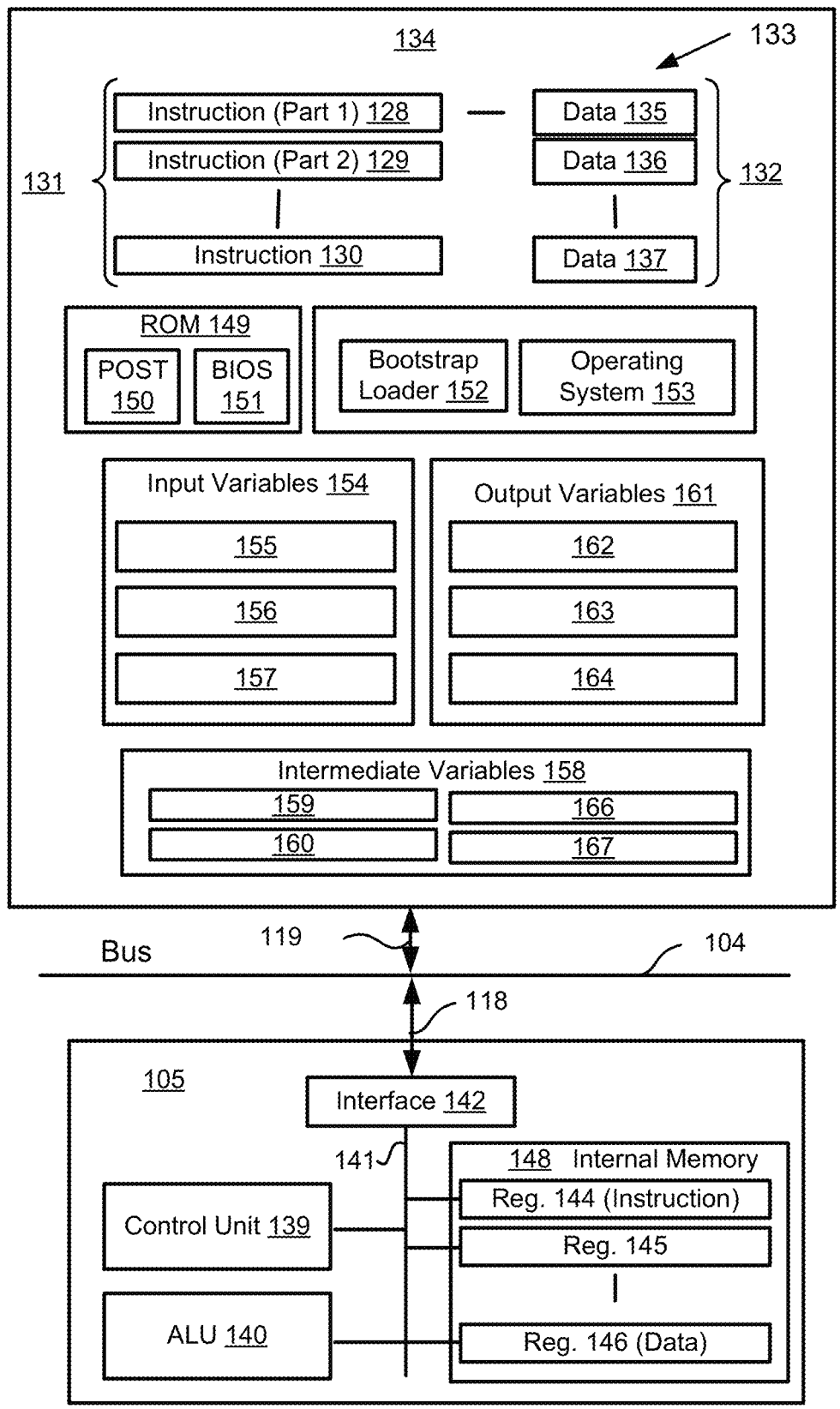

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The HD application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The HD methods described below may use input variables 154, which are stored in the memory 134 in corresponding memory locations 155, 156, 157. The disclosed HD methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the HD program 133. Each fetch, decode, and execute cycle comprises:

1) a fetch operation, which fetches or reads an instruction 131 from a memory location 128, 129, 130;
2) a decode operation in which the control unit 139 determines which instruction has been fetched; and
3) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2, 4, 5, 11, 15 and 17 may be associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133.

As described above, one or more steps of the processes of FIGS. 2, 4, 5, 11, 15 and 17, to be described, may alternately or in addition be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described HD methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
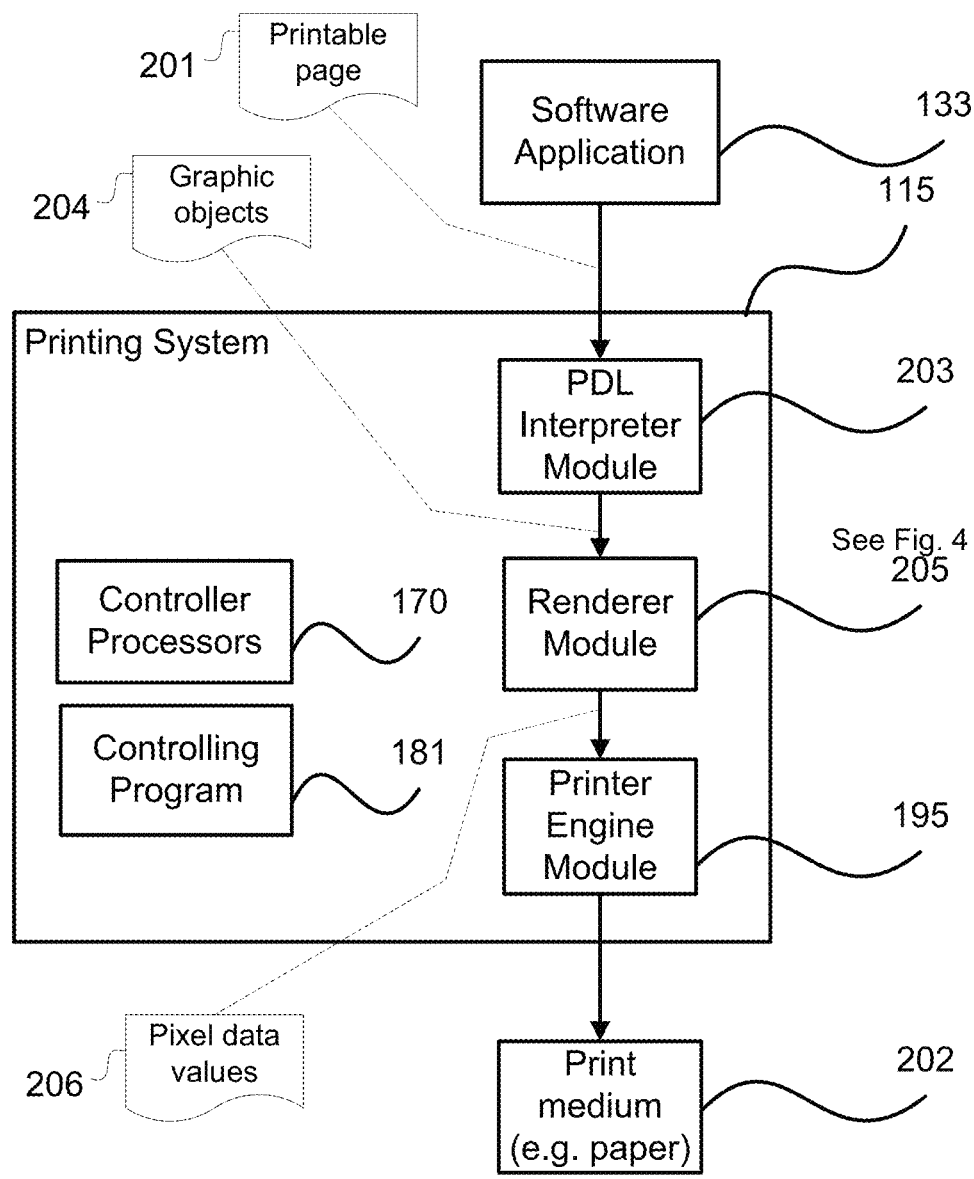
FIG. 2 is an example of a software architecture for the printing system of FIG. 1.

FIG. 2 shows an example of a software architecture for printing a printable page 201 using the computer system 100. Each of the modules 203, 205 described below may be implemented by one or more of the processors 170, 105, executing one or more of the software applications 181, 133, for example.

The software application 133, for example, executing on the computer module 101, provides the printable page 201 to the printing system 115 for printing to a print medium 202, such as a paper sheet. The printable page 201 is typically provided in the form of a description of the printable page 201, the description being specified using a Page Description Language (PDL), such as Adobe® PDF or Hewlett-Packard® PCL. The PDL provides descriptions of graphic objects to be rendered onto the print medium 202 in a rendering (or z) order, as opposed to a raster image (i.e., a bitmap of pixel values) of the page to be printed. The printable page 201 may be the whole or part of a print job created by the software application 133 executing in the computer module 101.

A PDL interpreter module 203 receives the printable page 201 and generates graphic objects 204 to be printed. The printing system 115 then uses a renderer module 205 to render the graphic objects 204 to pixel data values 206. The pixel data values 206 are printed to the print media 202, such as paper, using a printer engine module 195. The printer engine module 195 may, for example, be an electro-photographic engine.

The PDL interpreter module 203 and renderer module 205 may be implemented as one or more code modules of the controlling program 181 which is executed by the controller processors 170 within the printing system 115. The renderer module 205 will be described in more detail later with reference to FIG. 4.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

As described above, the processors 105 and the controller processors 170 can take many different forms, including single-core CPUs and GPUs. A schematic block diagram of a central processing unit (CPU) was described previously with reference to FIG. 3B. A schematic block diagram of a GPU 301 will now be described with reference to FIG. 3C.

Figure 3C:
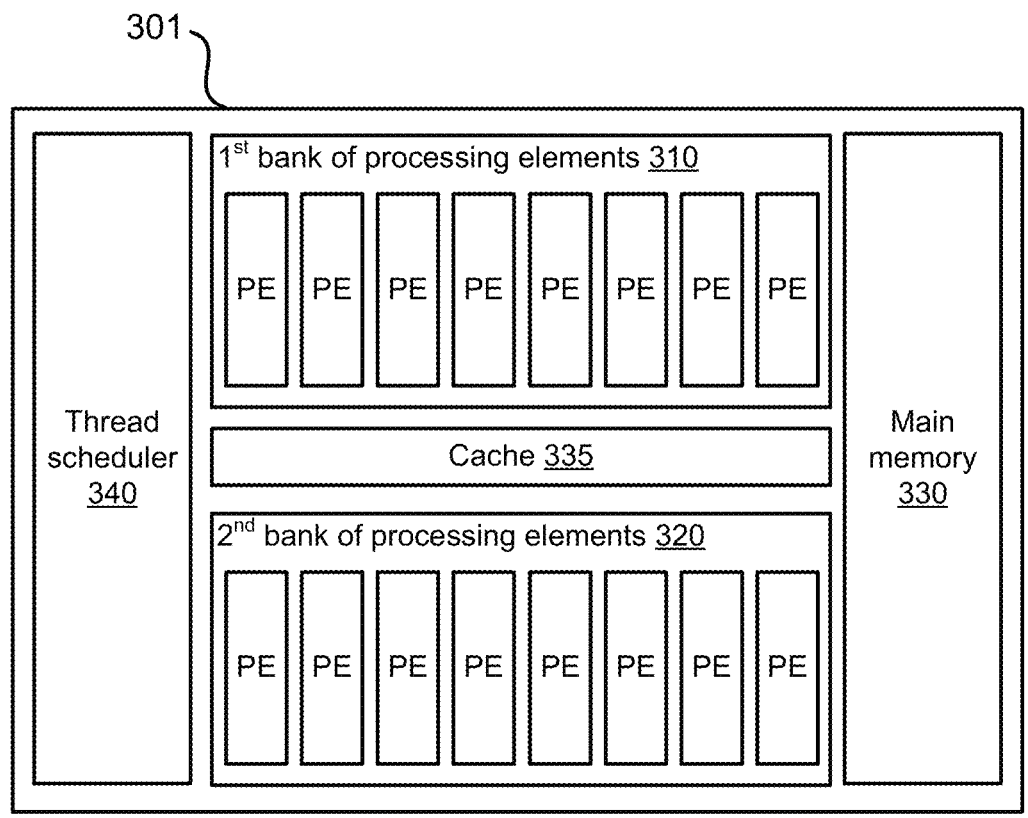
FIG. 3C is a schematic block diagram of a GPU processor upon which various HD arrangements described can be practiced.

FIG. 3C depicts a GPU comprising various processing elements. The example GPU 301 contains two banks of processing elements 310 and 320. Each processing element (PE) is capable of executing many threads of execution in parallel using one or more SIMD (single instruction multiple data) arrays. A processing element may also contain a small amount of fast cache memory and a scheduler for deciding which threads to execute at any given point in time. A higher-level thread scheduler 340 allocates blocks of threads to individual processing elements. Another level of cache memory 335 is typically provided between the processing elements 310 and 320, and a main memory 330. The main memory 330 may be a subset of the memory 190 of the printing system 115, or may be an entirely separate memory that is considered part of the GPU. The main memory 330 is typically large and slow to access. Many variations in GPU architecture exist, but most architectures share the general components shown in FIG. 3C.

Returning to FIG. 1, in the pixel rendering system 100, the software application 133 creates printable pages for printing, such as the printable page 201. The printable page 201 often contains graphic objects such as text, lines, fill regions, and image data. The software application 133 sends a high-level description of the printable page 201 (e.g., a PDL file) via the network 120 to the controlling program 181 that is executed by the controller processors 170 of the printing system 115. The printable page 201 typically contains all the information required by the printing system 115 to render and print the page.

In alternative arrangements, the printing system 115, the controller processors 170 and the controlling program 181, may be resident in separate servers connected to the network 120, such as the computer system 101. In still another alternative arrangement, the printing system 115, the controller processors 170 and the controlling program 181 may be resident in a distributed network of servers. In arrangements where the printing system 115, the controller processors 170 and the controlling program 181 are resident in separate servers or in a distributed network of servers, the raster image representation produced by the controlling program 181 is sent to the printer engine module 195 via a network rather than via the bus 175.

Renderer Module

Figure 4:
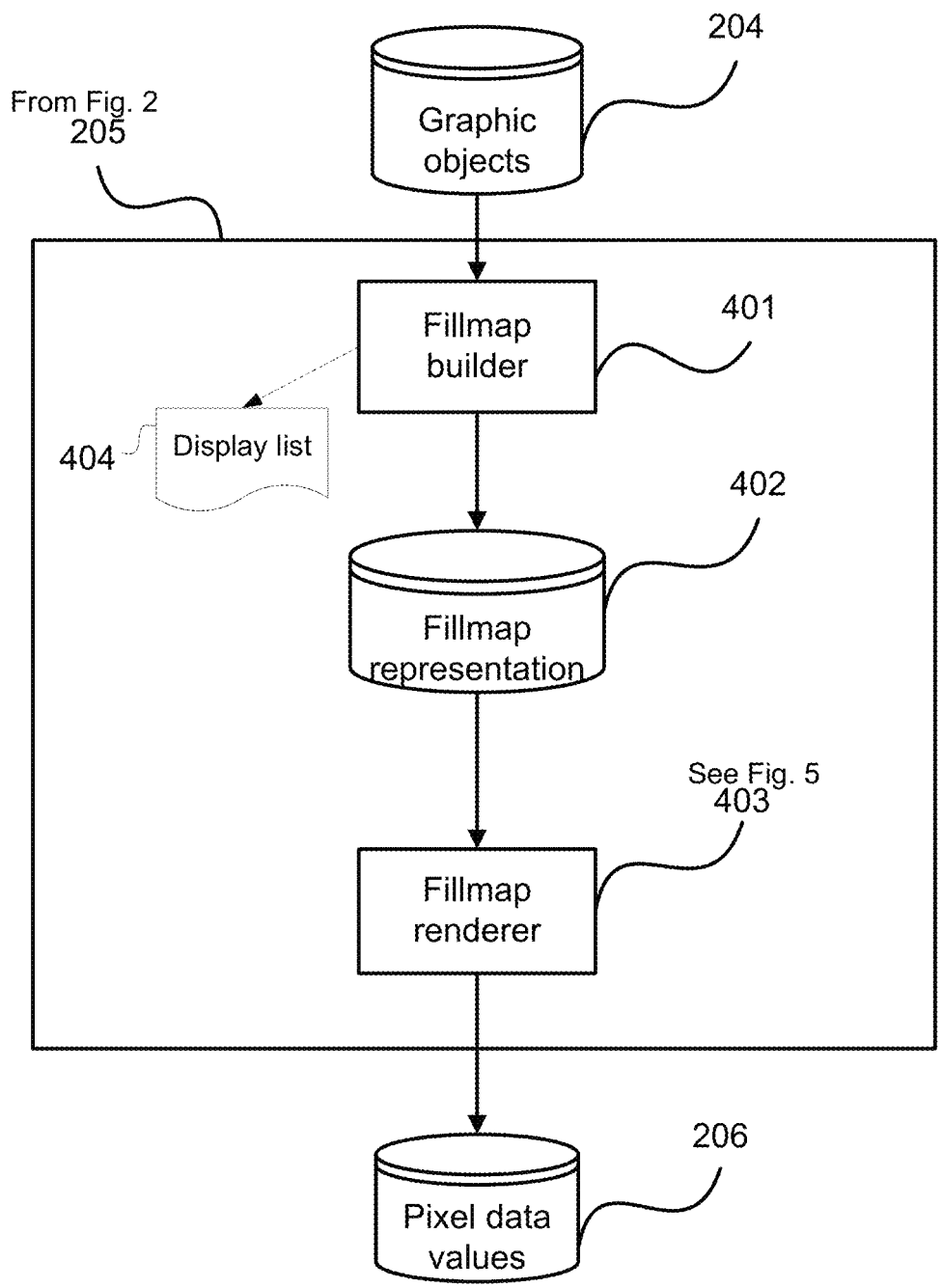
FIG. 4 is a schematic block diagram of a renderer module in a printing system.

FIG. 4 shows the renderer module 205 depicted in FIG. 2, in more detail. The renderer module 205 comprises a fillmap builder module 401 and a fillmap renderer module 403. The fillmap builder module 401 and the fillmap renderer module 403 may be implemented by one or more of the processors 170, 105, executing one or more of the software applications 181, 133. The renderer module 205 contains or otherwise implements one method of rendering the graphic objects 204 to the pixel data values 206.

As described above with reference to FIG. 2, the renderer module 205 receives the graphic objects 204. The fillmap builder 401 receives the graphic objects 204 in a drawing order known as z-order and converts the received graphic objects into an intermediate representation 402 referred to as a fillmap representation. The fillmap renderer 403 receives the fillmap representation 402 and renders it to pixel data values 206.

Fillmap Builder

The fillmap builder 401 adds the graphic objects 204 to a display list 404. A "type" of each graphical object 204 is identified by the PDL interpreter module 203. For example, the PDL document (i.e., the printable page) 201 contains commands specifying object shapes for graphics, fonts and their size for text, and commands for streaming image data for images. Thus, the PDL interpreter can pass the graphical objects 204 together with their associated "type" to the fillmap builder module 401 to generate the display list 404. Each display list entry contains information about the shape, the colour, and the compositing operation of the object, as well as the associated type. The compositing operation specifies how the object should be drawn over any underlying objects on a printed page. Additionally, the display list 404 can identify small text objects, e.g., a text object is considered to be small if the corresponding font size is below 6 pt, and thin line as having width of less than 5 pixels. Type information associated with entries in the display list 404 is further used to generate attribute types for fillmap edges.

The display list 404 is then converted by the fillmap builder 401 into the intermediate graphical representation 402 in the form of the fillmap. The fillmap 402 is generated by processing display list objects in increasing y-order (i.e., from the top of the print document page to the bottom). The generation of the fillmap 402 starts at a first scan line in the page 201. Processing continues one scan line at a time until all the objects in the display list 404 have been processed, or until the bottom of the page 201 is reached. At each scan line, the display list 404 is consulted. Any sub-paths that start on a current scan line are divided into y-monotonic edges (y-monotonic edges are edges that only increase in the y-direction). Accordingly, edges in the fillmap 402 consequently do not decrease in the y-direction. Any edges that start on the current scan line will be expanded into a set of straight-line vectors. Curved edges are vectorised such that the difference between the curved edge and the resultant straight-line vectors is below the resolution of an output device such as the printing system 115. Once an edge has been converted into vectors, a scan conversion process is performed on the vectors to convert them to fillmap edges that are aligned with the pixel grid of the output device. There are various scan-conversion methods which can be used, including Bresenham's algorithm, or solving the intersection in fixed or floating point calculations.

Each scan line is processed to generate a set of x-intercepts, corresponding to the positions where each pixel-aligned edge has been created from a vector that intercepts the scan line. Each x-intercept is labelled with a "z-level" (i.e., the ordering of the objects as the objects are painted on the page), a "direction" (i.e., indicating whether the edge is an enabling or disabling edge) and a level appearance (e.g., colour and/or alpha appearance) reference. There can be multiple pixel-aligned edges at the same x-intercept.

Once all the x-intercepts for a scan line have been determined, level processing is performed. The purpose of the level processing is to create a set of pixel-aligned fillmap edges corresponding to the x-intercepts. Each fillmap edge corresponds to the one or more x-intercepts at the same pixel. Associated with each fillmap edge is the set of level appearances that are active at the position of the edge. The set of level appearances comprises z-ordered levels, and is known as a "compositing sequence". A compositing sequence fully describes the colour and alpha appearance of a region associated with the edge.

An edge is also associated with a set of attributes providing extra information about all pixels on the right side of this edge (in which case the edge is an enabling edge) and on the left side of next edge (in which case that edge is a disabling edge) or the right boundary of the tile. For example an attribute may indicate that all pixels associated to an edge are part of: text, a natural image, a small object, the background, etc. If pixels for an edge are from more than one object, a resultant attribute may be determined according to the compositing sequence and the compositing operations. For example, if a transparent text is blended with a natural image, the attribute may be text because the text is on top of the image in z-order. Edges are derived primarily from the graphic objects 204. Thus, the size of an object is known. A small object might be a five pixel wide thin line or a text with less than 6 pt font size. Other rules for determining the attribute for multiple objects for an edge may be applied. Note that the delineated region for pixels associated to an edge will be illustrated later with reference to FIG. 6.

The attribute may be used in other processes of the fillmap renderer 403 such as colour conversion or dithering.

A set of fillmap edges is determined for the scan line. The above process is repeated on the following scan lines. As processing proceeds down the page 201, the sets of edges for each scan line can be joined across the scan lines, leading to the creation of two-dimensional regions on the page, denoted by the fillmap edges. By the end of the page 201, the entire content of the page has been converted to a set of pixel-aligned regions in device space. Each region references a compositing stack that describes the content. To reduce memory usage and to facilitate efficient rendering, the set of edges can be partitioned into tiles, which are then compressed separately and stored (e.g., in the memory 190) for later retrieval.

Fillmap Renderer

The fillmap renderer 403 iterates over the tiles in the fillmap 402 and renders, performs post-render colour conversion and trapping, and dithers each tile into a format that can be sent to the printer engine 195. The fillmap renderer 403 is described below in more detail with reference to FIG. 5. Each of the steps of FIG. 5 may be implemented by one or more of the processors 170, 105, executing one or more of the software applications 181, 133.

Figure 5:
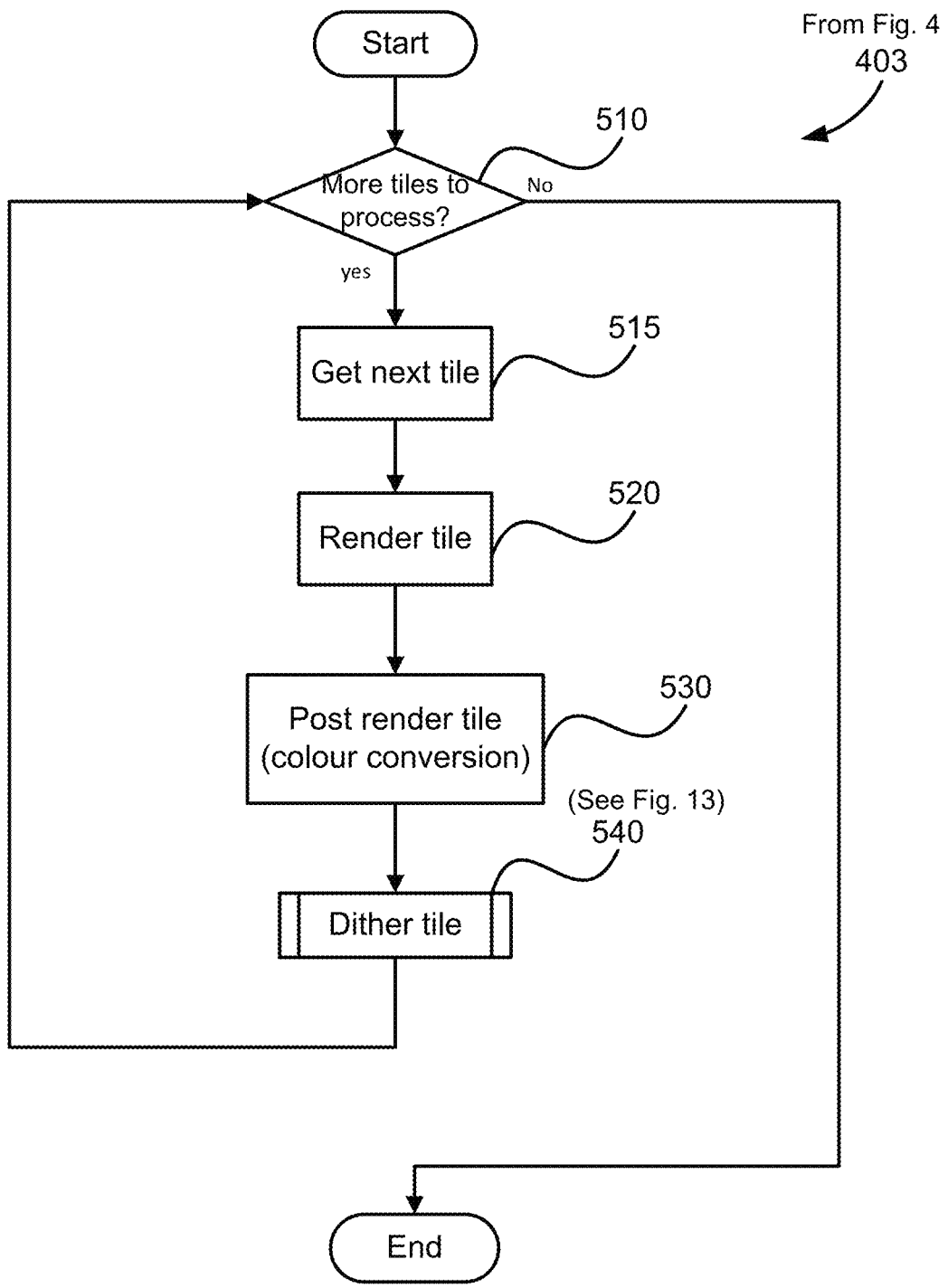
FIG. 5 is a schematic flow diagram of a fillmap renderer module.

FIG. 5 shows how the fillmap renderer process 403 starts with a decision step 510 which determines whether there are more tiles in the fillmap 402 to be dithered. If there is a tile to be dithered, processing follows a YES arrow and continues to a step 515 which obtains a tile from the fillmap 402. In one HD arrangement, the obtained data for a tile comprises edges, a fill compositing sequence associated with each edge, and an attribute for each edge representing the type of the top most object in the fill compositing sequence or a type of a composition of objects contributing to the fill compositing sequence as described previously.

The process 403 proceeds from the step 515 to a step 520 which renders the tile received in the step 515 into pixels with contone colour components. At a next step 530, a post-render process is typically applied to the rendered pixel values. This can include colour conversion from a contone render colour space such as RGB (for red, green and blue colour components) into a contone output colour space, usually CMYK (for cyan, magenta, yellow and black channels). In a following step 540, the contone pixel values of at least 8 bits per colour component are dithered into halftone pixels of fewer bits per colour component, generating a gradient-like effect that simulates the contone page to form the pixel values 206. More details of the dithering process 540 will be described later with reference to FIG. 13.

Upon completion of the dithering process by the step 540, processing returns to the step 510 to check whether any more tiles in the fillmap 402 remain to be processed. If there are no more tiles to be dithered, the process 403 follows a NO arrow and concludes. Following completion of the process 403, the halftoned pixels of all tiles of a page in the output pixel data 206 are in CMYK and are ready to be sent to the printing engine 195 to be printed on a paper.

As described above with reference to FIG. 2, the controlling program 140, and therefore the renderer component 205, is executed by the controller processors 170. The fillmap builder 401 and fillmap renderer 403 may utilise any suitable multi-threading method to reduce the time spent processing the graphic objects 204. Furthermore, some of the processes 520, 530 and 540 in FIG. 5 or their sub-processes in the Fillmap renderer 403 in FIG. 4 can be executed by CPU or GPU in the controller processors 170. If a CPU has wide registers that provides SIMD (Single Instruction Multiple Data) support, any of the processes 520, 530 and 540 can use the instructions provided by the SIMD processor to improve their performance.

However, determining which tile should be rendered, post-rendered or dithered using a CPU and which one should be processed using a GPU is crucial to achieve the maximum performance of the fillmap renderer 403. The disclosed HD arrangements are focused on the dither process 540 in the fillmap renderer 403 and disclose a hybrid dithering method which determines whether to dither any individual tile on CPU or on GPU.

In another HD arrangement, the process 403 can be modified to get the next group of tiles in the step 515, render the group of tiles in the step 520, poster-render the group of tiles in the step 530 and dither the group of tiles in the step 540. For some GPUs, dithering multiple tiles on a GPU is more efficient than dithering a single tile, if tile dimensions are small. Thus, grouping multiple tiles to dither at once can achieve a better performance.

Fillmap Representation

A fillmap representation such as 402 of graphical data such as a page will now be described in more detail. A fillmap is a region-based representation of graphical data contained in the page 201. The fillmap 402 maps a region of pixels within the page 201 to a fill compositing sequence which is evaluated to generate the colour data for each pixel within that fillmap region. Multiple regions within a fillmap can map to the same fill compositing sequence. Fillmap regions within the fillmap do not overlap and therefore each pixel in the rendered page belongs to a single fillmap region. Each region within the fillmap is defined by a set of pixel-aligned fillmap edges which activate (i.e., enable) the fill compositing sequence associated with that fillmap region. Pixel-aligned fillmap edges:

(i) are monotonically increasing in they direction of the page;
(ii) do not intersect each other;
(iii) are aligned with pixel boundaries, meaning that each pixel-aligned fillmap edge consists of a sequence of segments, each of which follows a boundary between two adjacent pixels;
(iv) contain a reference to the compositing sequence required to be composited to render to pixels the fillmap region to which the pixel-aligned fillmap edge belongs; and
(v) activate pixels within a single fillmap region.

On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated (i.e., disabled), and the fillmap region corresponding to the second pixel-aligned fillmap edge is activated.

Figure 6A:
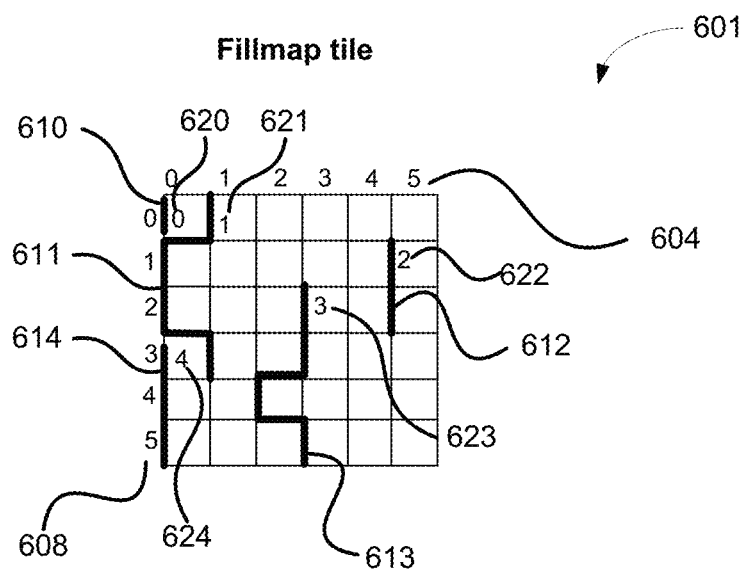
FIG. 6A shows an example of pixel-aligned object edges of a fillmap tile.
Figure 6B:
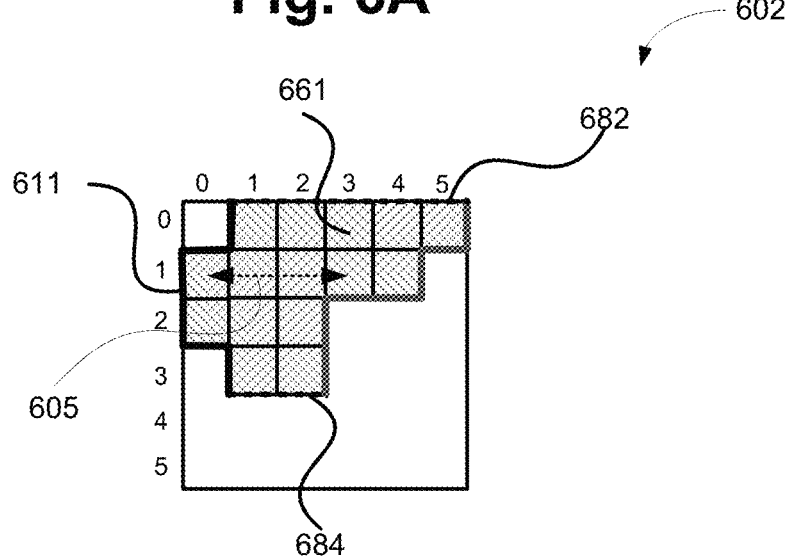
FIG. 6B shows an example of a region from the fillmap tile in FIG. 6A.

FIG. 6A shows an example of edges of a fillmap tile 601, while FIG. 6B shows an example 602 of a region 661 associated with one edge 611 in the fillmap tile 601 in FIG. 6A. The tile in FIG. 6A is six (6) pixels wide by six (6) pixels high. The fillmap tile 601 has five edges 610-614. The edges 610-614 are referenced by edge indices 620-624. For example, the edge index 0 (i.e., 620) refers to the edge 610 and the edge index 4 (i.e., 624) refers to the edge 614. The order of association of edge indices to edges follows the order in which edges were generated in the original fillmap representation 402 where the edges are ordered by starting y-coordinate. The x-coordinates of the edges are described by horizontal indices 604 and the row indices are indicated by vertical indices 608. Horizontal and vertical indices are distinct from edge indices.

The region associated with a given edge is formed by the given edge as the left hand boundary, a right hand boundary formed by edge or edges immediately to the right of the given edge or the right edge of the tile, and top and bottom boundaries are implied, as described hereinafter in more detail with reference to FIG. 6B.

FIG. 6B shows an example 602 for the region 661 which is associated with the edge 1 (i.e., 611). The Edge 1 (i.e., 611) forms its left hand boundary. Parts of the right edge of the tile, the edge 2 (i.e., 622) and the edge 3 (i.e., 613) form the region's right hand boundary. A top boundary 682 is formed by the horizontal line along the tops of pixels at the start y-coordinate of the current edge 611. A bottom boundary 684 is defined by the horizontal line along the tops of pixels for the end y-coordinate. The horizontal boundaries extend as necessary between the left and right boundaries.

Within a fillmap, the fill compositing sequence active within each fillmap region is stored in a table of fill compositing sequences. A fill compositing sequence is a sequence of z-ordered levels, where each level contains attributes such as a fill, the opacity of the level, a compositing operator which determines how to mix the colour data of this level with other overlapping levels, and the priority, or z-order, of the level. A fill compositing sequence contains references to all the levels which contribute colour to the pixels within the associated fillmap region. The table of fill compositing sequences contains all the fill compositing sequences required to render the page to pixels. In one HD arrangement, the table of fill compositing sequences does not contain duplicate instances of identical fill compositing sequences. Hence, multiple fillmap regions within a fillmap which map to the same fill compositing sequence map to the same instance of the fill compositing sequence within the table of fill compositing sequences.

Each fillmap region is characterised by an attribute type (e.g., text, graphics, image) representing a distinct content type in that region that may be identified within an individual pixel run in the region. Thus for example text content of a fillmap region is associated with a "text" attribute type. This attribute information is useful for post-render procedures like colour conversion and halftoning, where different algorithms or optimizations can be applied. For example, the HD system might want to use profile-based colour management for better quality reproduction of natural images, while using simple non-colourmetric colour conversion for text and graphics for better performance. In the disclosed HD arrangements, the attribute type is also used to select a set of dither matrices for dithering. A dither matrix contains the thresholds for comparison with a pixel colour component during dithering.

Figure 7:
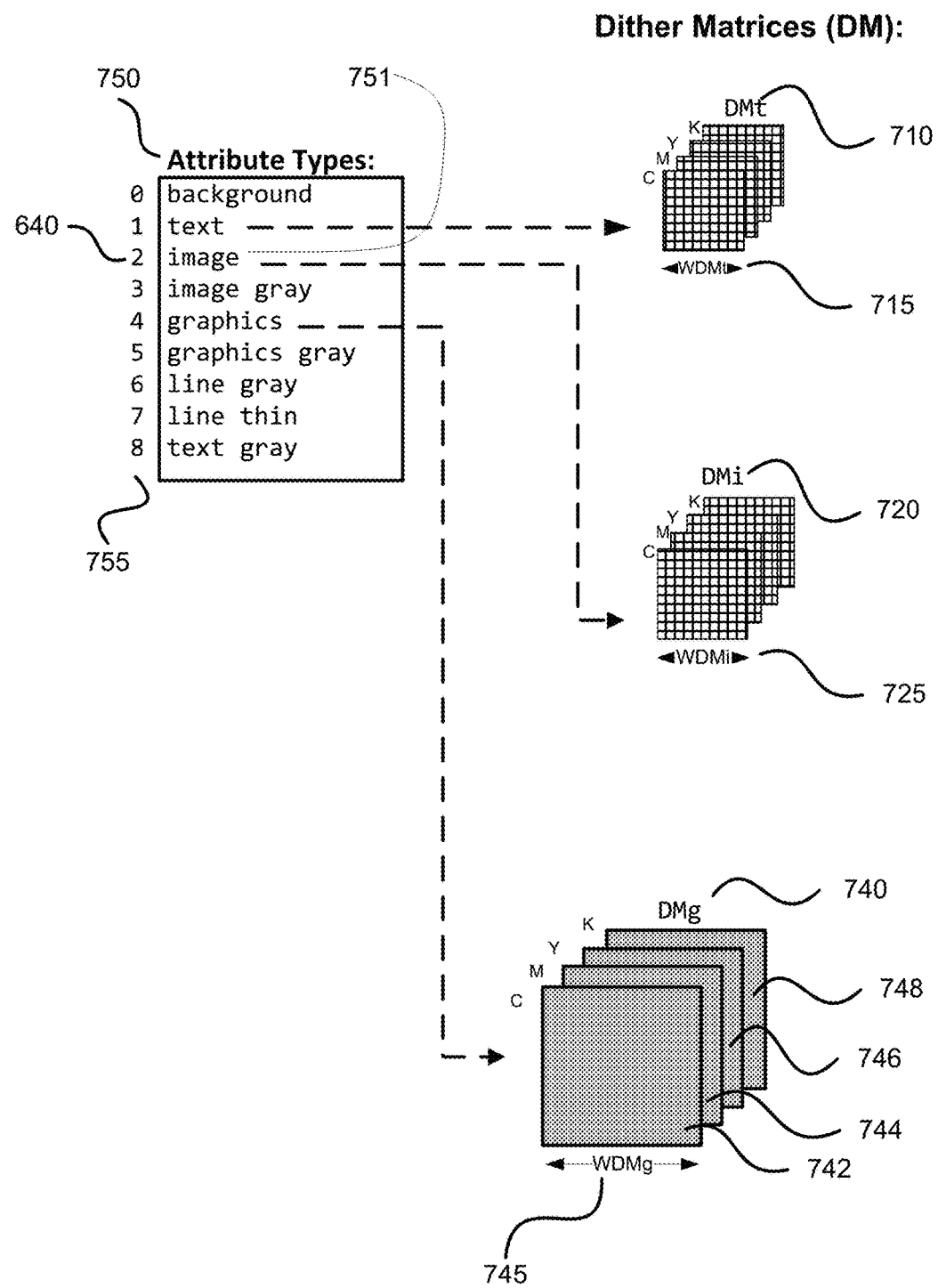
FIG. 7 is an example of a table of attribute types in a fillmap and associated dither matrices.

A fillmap tile such as 601 is also associated with an attribute list 635, where the elements (such as 640) of the list 635 are indices into a table (750) of attribute types (see 750 in FIG. 7).

Figure 6C:
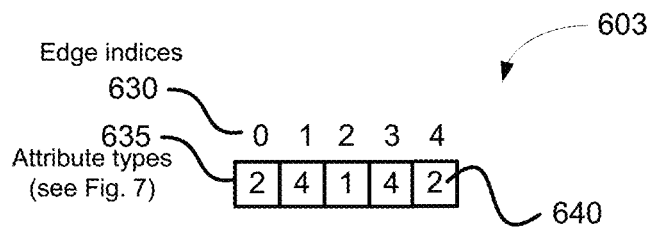
FIG. 6C shows an example of an attribute list of the fillmap tile in FIG. 6A.

FIG. 6C shows an example 603 of an attribute list 635 for the fillmap tile 601 in FIG. 6A. The attribute list 635 contains an entry for each edge which references a corresponding attribute type. For example, the indices 630 of the attribute list 635 correspond to the edge indices 620-624 respectively. The elements of the attribute list are the indices 755 to the table 750 of the attribute types. For example, the last element 640 for the edge index 4 of the attribute list 635 is 2, which corresponds to the "image" attribute type 751 in the table 750 of attribute types.

Dithering

Dithering is a halftoning process in which dither matrices constructed according to certain patterns are applied to the contone pixels to produce halftone pixels in order to generate a gradient-like effect that simulates or approximates the contone image. The dithering method uses dither matrices to convert colour with a higher number of bits to a lower number of bits, e.g., 8-bit to 2-bit colour representation. For example, each 8-bit colour component of a pixel is compared with a corresponding threshold in one dither matrix to produce a 1-bit colour component.

For 2-bit-per-channel dithering, each set of dither matrices for each colour component contains three matrices with the value of a particular element of a first matrix (dm1) being less than the value of the corresponding element of a second matrix (dm2), which in turn is less than the value of the corresponding element of a third matrix (dm3), for every colour component in the CMYK colour space. The 2-bit dithered value for a pixel is based on where the contone value lies in relation to the values of the three matrix elements assigned to that pixel. If the pixel colour value exceeds the value for the pixel in dm2 (in a first pass of comparison), then the high bit of the dithered result for the colour channel is set as 1, and the value for the pixel in dm3 of the dithering matrix set is then compared to the pixel colour value in a second pass of comparison. Otherwise, if the pixel colour value is less than or equal to the corresponding value in dm2 in a first pass of comparison, then the high bit of the dithered result for the colour channel is set as 0, and the value for the pixel in dm1 of the dithering matrix set is then compared to the pixel colour value in the second pass of comparison. The low bit of the dithered result for the colour channel is determined by the result of the second comparison with either dm1 or dm3. For example, if a pixel colour value is 194 and three corresponding element values from three dither matrices (dm1, dm2, dm3) are 10, 150, and 204, respectively, the pixel colour value 194 is compared element values as below:

```
IF P > 150      // first pass of comparison (compared with 150
    from dm2)
THEN
    D = 10      // high bit is set to 1, low bit will be
        updated later
    IF P > 204  // second pass of comparison (compared
        with 204 from dm3)
    THEN
        D = 11
    ELSE
        D = 10  // for the pixel colour value 194, the
            output is 10
ELSE
    D = 00      // high bit is set to 0, low bit will be
        updated later
    IF P > 10   // second pass of comparison (compared
        with 10 from dm1)
```

```
THEN
    D = 01
ELSE
    D = 00
```

The best dithering method to use on a part of a page depends greatly upon the nature of the object that was rendered to produce the pixels on that part of the page. Pixels rendered from thin lines and sharp edges, such as text, are particularly difficult, because any pixel along an edge that is mapped to the background colour by dithering will reduce the legibility of the text. On the other hand, large flat areas of colour, occurring in flat-fill object graphics, can use a fairly coarse dither matrix. Using a regular dither pattern on flat colours can provide a greater impression of uniformity. For natural images, a finer dither matrix is generally preferred. The ability to select an appropriate dither matrix for specific content in a graphic image requires that each pixel in the image be associated with an attribute indicating what type of object was rendered into that pixel. A suitable dither matrix can then be selected and applied. The advantages of selecting a dithering method based on the attributes types include better quality of dithered pixels in a page and independent calculation for dithered pixels.

FIG. 7 shows an example of an attribute type table and associated dither matrices for dithering pixels to 1-bit per colour component. The indices 755 of the attribute type table 750 are referred to as the attribute indices which are element values in the attribute list 635 of a fillmap tile such as the example 601 in FIG. 6A. Each attribute type has a set 740 of four dither matrices 742, 744, 746 and 748, one for each CMYK colour component. In one HD example attribute type table 750, index 1 defines a text attribute with a set of dither matrices DMt 710, while indices 2 and 4 define image attribute and graphics attributes respectively with dither matrices DMi 720 and DMg 740, respectively. Dither matrices in the same set have the same width and height (in number of pixels). The widths associated with the sets of dither matrices DMt 710, DMi 720 and DMg 740 are indicated by parameters WDMt (i.e., 715), WDMi (i.e., 725) and WDMg (i.e., 745), respectively. Usually, a dither matrix is square, i.e., the width and the height of a dither matrix are the same.

Sets of dither matrices are typically pre-defined by printer manufacturers and are provided along with printer drivers or are embedded in printer firmware. Typical sizes include 16×16 or 24×24 pixels, but other sizes are possible.

Dithering is generally implemented using a CPU, but can be alternatively implemented using a GPU.

Overview of the HD Arrangement

The disclosed HD arrangements address the issues of the prior art. Disclosed is a hybrid dithering method that dithers pixels of every tile of a fillmap using dither matrices according to the attributes of the pixels on an appropriate processor (CPU or GPU).

It has been observed by the present inventors that performance of dithering on a CPU depends on the characteristics of the content of each scan line of a tile (such as 601) and on the shapes of the regions derived from edges of an associated fillmap tile which forms part of the fillmap representation 402. However, performance of dithering on a GPU is roughly constant, because every thread executes the same instruction comparing the value of a pixel component with a threshold from a dither matrix. An efficient selection between a CPU method or a GPU method is thus determined on the basis of the spatial properties and rendering attributes of the regions in a tile. The best dithering method is determined based on a dithering time prediction model. However, a CPU or GPU can be selected to dither the fillmap tile if it is available or according to workload balance of the heterogeneous HD system. This hybrid HD dithering method allows distribution of dithering tasks of tiles in a fillmap page to different computational resources (CPU and GPU processors) in order to maximise the overall performance of the system.

CPU Dithering

For the purposes of the HD arrangements a "pixel run" is defined as a sequence of contiguous pixels along a scan line. A pixel run can contain pixels of multiple attribute types. In order to dither such a run, it likely requires more than one set of dither matrices. A "pixel span" however is a sequence of contiguous pixels associated with one attribute type and one compositing stack, generally occurring between two delimiting graphical conditions, such as two object edges. Some pixel spans, for example, may be formed of bitmap pixels (where the relevant object references a bitmap image), others may be solid colours or flat colours, whereas others may be blends, composites, gradients, or combinations of these.

To dither the pixels on a page, dither matrices are repeatedly applied across the page, generally starting from the top left corner. Every pixel on the page corresponds to a matrix element based on this repetition. For example, for a 4×4 matrix, the first 4 pixels on each of the first 4 scan lines of the page are associated with the corresponding elements in a corresponding row and column of an instance of the matrix. The following 4 pixels are similarly associated with a repeated instance of the matrix, and so on, across the page. Likewise, each lot of 4 pixels on the second set of 4 scan lines of the page are associated with the elements of the matrix, and so on across and down the page. Thus each pixel is compared to an element of a relevant matrix according to the position of the pixel in the grid of matrices laid out on the page. The 4×4 dither matrix is used to simplify the description of the HD arrangement. In practice, dither matrices are usually 16×16 or 24×24 pixels, but other sizes are possible.

In a tile-based rendering system, a page such as 201 is divided into tiles.

Figure 8A:
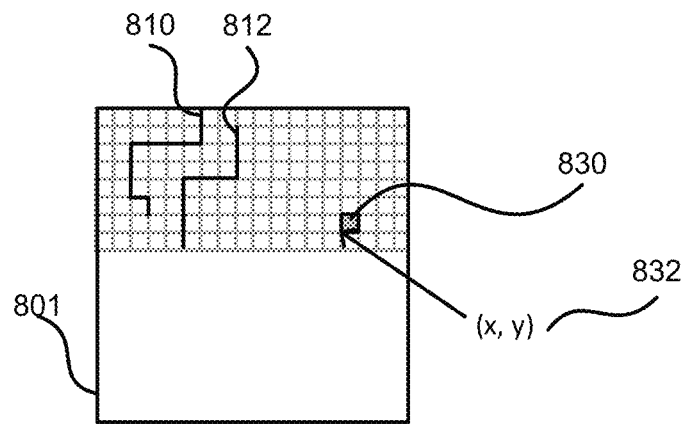
FIG. 8A shows an example of pixels to be dithered and edges in a fillmap tile.

FIG. 8A shows an example of a tile 801 with two edges 810 and 812. The edge 812 has an associated attribute type, e.g., graphics, that determines which set of 4×4 dither matrices to use. Once a region of a tile has been rendered to pixels, the pixels need to be dithered. Since a different dither matrix can apply to each region, dithering can be performed region by region. Alternatively, if dithering is done by scan line, a dither matrix is selected at the beginning of every pixel span. In a fillmap representation, each region is identified by its left edge, so dithering proceeds by considering each fillmap edge in turn. The result of dithering is placed in an output buffer and sent to the printer engine 195.

Figure 8B:
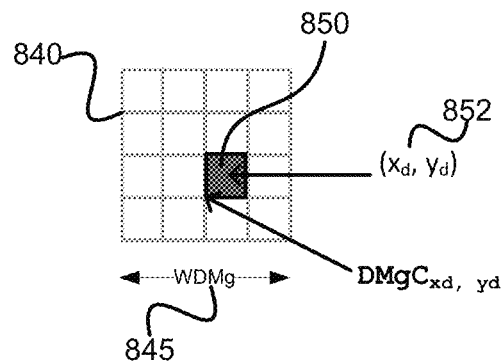
FIG. 8B shows an example of a dither matrix for a colour component and thresholds in the dither matrix.

FIG. 8B shows, in expanded form, a dither matrix DMgC 840 for cyan. To dither the pixel 830 at coordinates (x, y) (i.e., 832) in the tile, its corresponding coordinates in the dither matrix need to be calculated using the formulas below:

$x_d = x \bmod WDMg$ $y_d = y \bmod WDMg$ where ($x_d$, $y_d$) are the coordinates of the element of the dither matrix 840 corresponding to the pixel (x, y) in the dither matrix DMgC (i.e., 840), and WDMg (i.e., 845) is the width and the height of the dither matrix DMgC (i.e., 840). A matrix element provides a threshold for determining the halftoned colour of the corresponding printed pixel. If the output colour is represented by 1 bit, the threshold is used to determine whether a process colour is deposited at ($x_d$, $y_d$).

If a region identified by another fillmap edge 810 is associated with the image attribute, then when the region is dithered, the width WDMi (i.e., 725) of the dither matrix DMi (i.e., 720) for the image attribute is used to calculate the coordinates in the dither matrix 720 of the appropriate threshold for each pixel in the region.

The value of the element 850 at the location ($x_d$, $y_d$) (i.e., 852) in the dither matrix 840 is a threshold DMgC with which the cyan component of the pixel 830 at (x, y) (i.e., 832) needs to be compared. The resulting dithered colour $DC_{x,y}$ is calculated from the cyan component $PixelC_{x,y}$ as follows:

$$DC_{x,y} = PixelC_{x,y} > DMgC_{xd,yd} ? 1:0$$

where: $DC_{x,y}$ is the dithered colour value for cyan component at (x, y); $PixelC_{x,y}$ is the pixel colour value for cyan component at (x, y); $DMgC_{xd, yd}$ is the value of the element at ($x_d$, $y_d$) in the dither matrix for cyan component for graphic attribute.

Figure 8C:
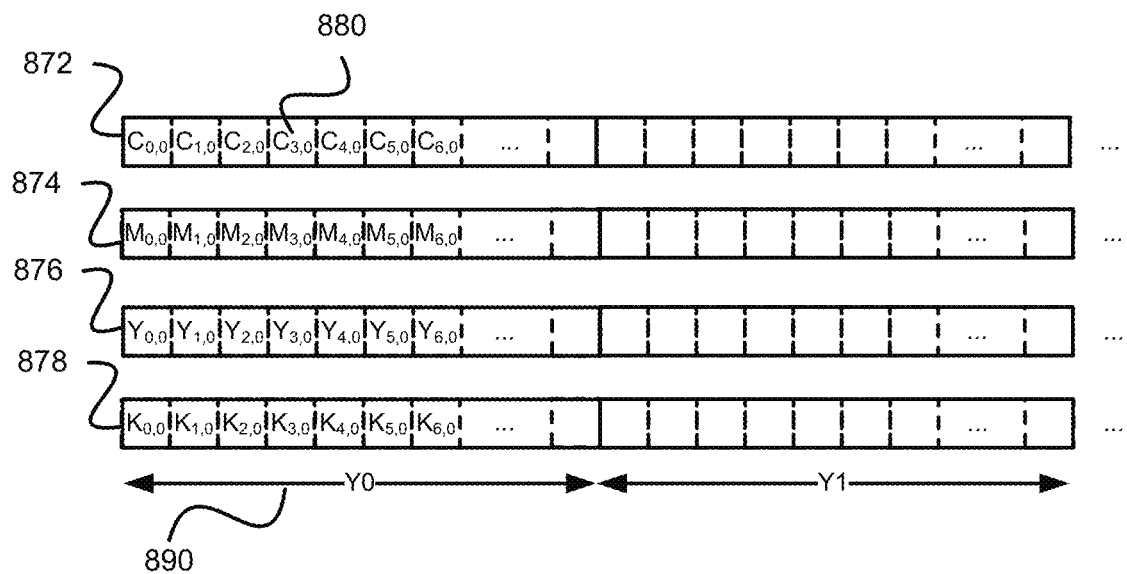
FIG. 8C shows an example of CMYK colour buffers.

The pixels to be dithered are stored in CMYK colour component (channel) input buffers 872, 874, 876, and 878 shown in FIG. 8C. The elements of the input colour component buffers each have 8 bits, i.e., $PixelC_{x,y}$, represented by $C_{x,y}$ in the cyan component buffer 872, is an 8-bit number. The elements in the input buffers 872, 874, 876, and 878 corresponding to the first row of the tile 801 are indicated by Y0 (i.e., 890). For example, the cyan component 880 of pixel (3, 0) is stored in the cyan input buffer 872.

The output pixel colours of the dithering process are stored in another set of CMYK colour output buffers that are structurally similar to 872, 874, 876, and 878 shown in FIG. 8C. However, each element in the colour component output buffer has only 1 bit.

The pixel-based CPU dithering method can be improved when pixel runs have certain characteristics. For example, one improvement for a region with flat colour is to cache the result of dithering a group of pixels corresponding to one instance of a dither matrix, and to copy the cached result to all pixels of the region. Another improvement is to use an SIMD processor such as Intel's Stream SIMD Extension (SSE) to dither multiple pixels using wide registers in the CPU when the pixels in the wide register have the same attribute. More details of these two improvements to CPU dithering will be described below with reference to FIG. 9A, FIG. 9B and FIG. 10.

CPU Dithering with Caching (i.e., the CPU Caching Method)

Pixels with the same attribute are dithered with the same set of dither matrices. If many pixels in a tile have the same attribute and the same colour, the result of dithering a group of pixels corresponding to one instance of a dither matrix can be cached in a buffer referred to as a "dithered colour pattern" for later use.

Figure 9A:
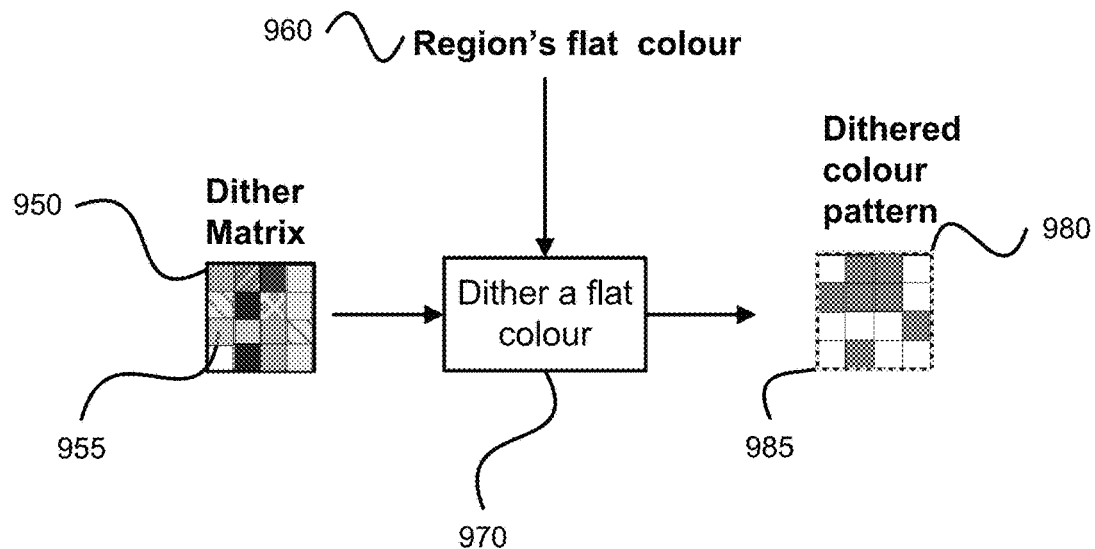
FIG. 9A is a schematic block diagram illustrating rendering of a flat colour at every element of the dither matrix with an example of a dither matrix.

FIG. 9A illustrates a process of dithering 970 a flat colour 960 for every position in a dither matrix 950 for one colour component, e.g., cyan. The process depicted in FIG. 9A may be implemented by one or more of the processors 170, 105, executing one or more of the software applications 181, 133. A resulting dithered colour pattern is shown in 980. The flat colour of a region 960 is compared with every element (e.g., element 955) in the dither matrix 950 by the dithering process 970. The result of the comparison for 1-bit dithering is set in the corresponding element (e.g., element 985) of the dithered colour pattern 980. For 1-bit dithering, the result is zero (0) or one (1), represented in the FIG. 9A as an empty cell or a dark grey cell respectively.

Once the dithered colours are cached for a particular colour, dithering a pixel with the same colour can utilise an element from the dithered colour pattern, i.e., a value from the dithered colour pattern is copied instead of being compared with a threshold. The larger a region, the more pre-computed dithered results can be copied without going through the comparison step for each pixel. The more dithered colours from the dithered colour pattern can be copied to a region of output, the greater the benefit for dithering speed. Similar method can be applied for 2-bit or 4-bit dithering.

Figure 9B:
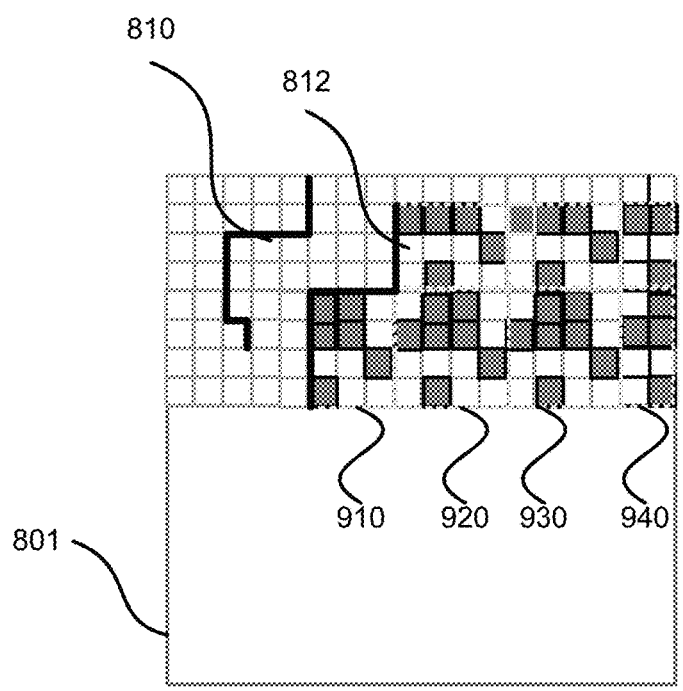
FIG. 9B is an example of a dithered tile in FIG. 8A using the dither matrix in FIG. 9A.

FIG. 9B shows the complete dithered colour pattern 980 applied to one colour component of the region associated with the edge 812 of example fillmap tile 801. The dithered colour pattern 980 is copied twice at 920, 930 at the middle of the bottom half of the region and several partial instances of the dithered colour pattern 980 are copied to different parts of the region. For example, the last three columns of the dithered colour pattern 980 are copied to the beginning of the bottom part of the region 910, while the first two columns are copied to the end of the bottom part of the region 940.

CPU Dithering with SSE (i.e., the CPU SSE Method)

As another improvement to performance, dithering can be performed by the CPU on an SIMD processor, or a general purpose processor with SIMD capability, such as Intel's Stream SIMD Extension (this type of processor is referred to as SSE). Using SIMD, one pixel run is dithered at a time, instead of one pixel at a time. In conventional systems, the length of the pixel run that can be processed by a SIMD type processor depends on two factors, the SIMD capability of the processor and the content of the pixel run. The SIMD capability varies with processor model. While the Intel's SSE2 (Stream SIMD Extension 2) CPU processor has 128-bit registers, the Intel AVX instruction set allows up to 512 bits of data to be processed at the same time with each SIMD instruction. With regard to the content type, pixels having different types of attribute often require dithering using different sets of dither matrices. For example, pixels of a high quality image might need to use a set of dither matrices optimized for high resolution images (such as the "HIGH_RESOLUTION" matrix set presented later in relation to an example), while pixels of a graph might need to use a set of dither matrices for computer graphics (such as the "TONED" matrix set presented later in relation to an example). The dither matrices in one set can have a different size from the dither matrices in another set. Furthermore, dither matrices in different sets typically contain different values, forming different patterns to generate a gradient-like effect that simulate the contone colours. The dither matrices are normally pre-defined by the printer on which the page is to be printed. Therefore, the length of a pixel run that can be processed by SSE2 instructions in a conventional system may be further limited by the length of a group of continuous pixels of the same attribute type (a pixel span) requiring the same set of dither matrices.

Intel's SSE2 (Stream SIMD Extension 2) CPU processor has 128-bit registers and intrinsic functions to operate on these wide registers. This allows dithering 16 pixels in one colour component at one time as every colour component is represented by 8 bits (16×8 bits=128 bits).

Figure 10:
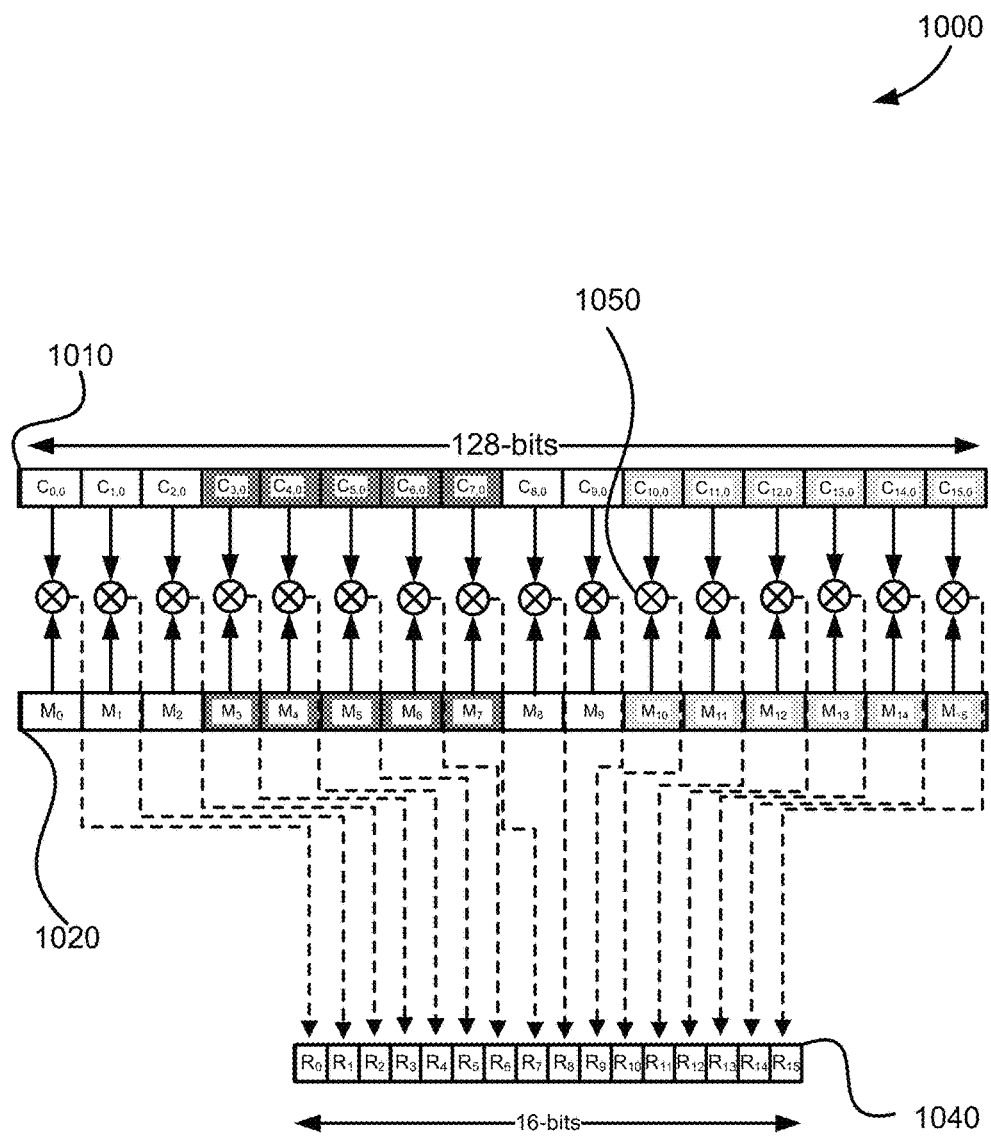
FIG. 10 depicts an example of comparing two arrays of 16 byte data (128-bits) in SSE (("SSE" is Stream SIMD Extension, where "SIMD" is Single Instruction Multiple Data) operation.

FIG. 10 shows an example of dithering 16×8-bit input colour components of a particular colour channel to generate 16×1-bit output colour components using SSE2 wide registers. The process depicted may, however, be implemented by one or more of the processors 170, 105, executing one or more of the software applications 181, 133. Colour components from an input colour buffer (e.g., the cyan input buffer 872) are copied to a 128-bit register 1010 and corresponding thresholds from the appropriate dither matrix (710, 720, 730) are copied to another 128-bit register 1020. Then an SSE instruction comparing the two wide registers 1010 and 1020 as packed 8-bit integers is applied. An example of the SSE intrinsic function is listed below:

_mmask16_mm_cmpgt_epi8_mask (_m128i a, _m128i b)

Where: '_mm_cmpgt_epi8_mask' is the comparison function which outputs 1 if a is greater than b, and outputs 0 otherwise; '_m128i' is the data type representing 16 packed 8-bit integers; 'a' and 'b' are two variables of type '_m128i' to be compared; '_mmask16' is the data type for a 16-bit mask for returned value.

There are sixteen comparisons performed at the same time by this SSE instruction. Each comparison 1050 takes one 8-bit data value from the first SSE register 1010, and another 8-bit data value from the second SSE register 1020. The results are returned packed into a 16-bit integer in a register 1040.

A pixel run can contain one or more pixel spans each of which is associated with an attribute. For example, the pixel run 1010 has four pixel spans, $C_{0,0}$-$C_{2,0}$, $C_{3,0}$-$C_{7,0}$, $C_{8,0}$-$C_{9,0}$, and $C_{10,0}$-$C_{15,0}$. The thresholds from dither matrices loaded into the second register 1020 are $M_0$-$M_2$ and $M_8$-$M_9$ from one dither matrix, and $M_3$-$M_7$ and $M_0$-$MP_{15}$ from two different dither matrices. The more small pixel spans lie in a pixel run, the more copying overhead is involved. Thus more processing time is required to prepare for executing the SSE instructions.

The best mode for SSE dithering is when there is only one pixel span associated with one attribute and thresholds from one dither matrix are copied. Thus, it involves minimum preparation time for SSE instruction. If there are two pixel spans with the same attributes, they use the same dither matrix, even though they might have different colour values. The two pixels spans can thus be merged into one pixel span for the purpose of the SSE instruction.

GPU Dithering Method

SIMD parallel computing can be also applied on a GPU where there is a massive number of parallel cores and more complicated instructions can be executed on each core. GPUs are widely used for many image processing applications including dithering. As dithering each pixel in a tile is independent of dithering other pixels, pixel-parallelism for 128×128 pixels in a tile is possible for dithering on a GPU. Each pixel's 8 bit colour component value is compared with a corresponding threshold from the dither matrix related to the pixel's attribute.

Figure 11:
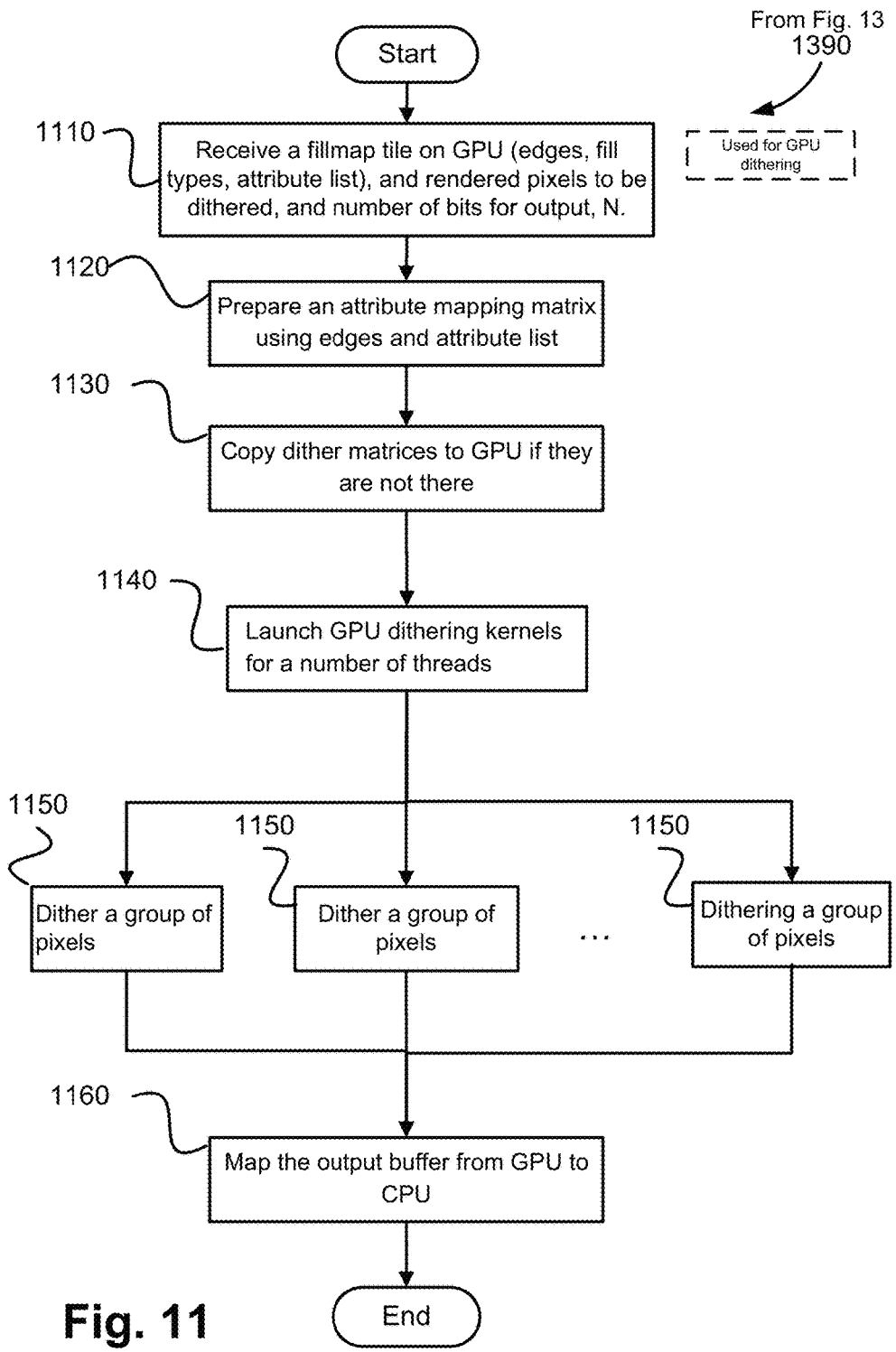
FIG. 11 is a schematic flow diagram showing one method of GPU dithering.
Figure 12A:
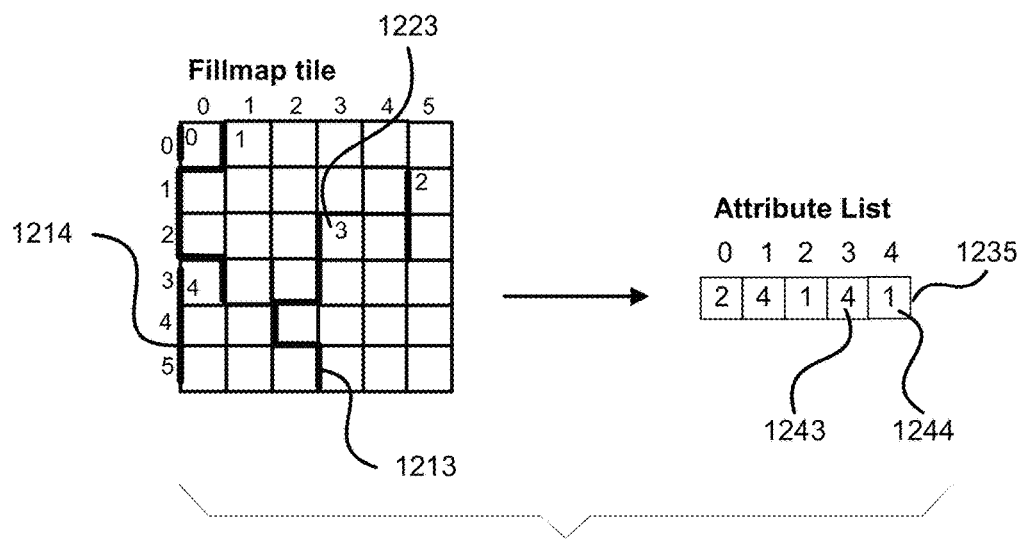
FIGS. 12A and 12B show an example of an attribute matrix for the fillmap tile in FIG. 6A and FIG. 6C.
Figure 13:
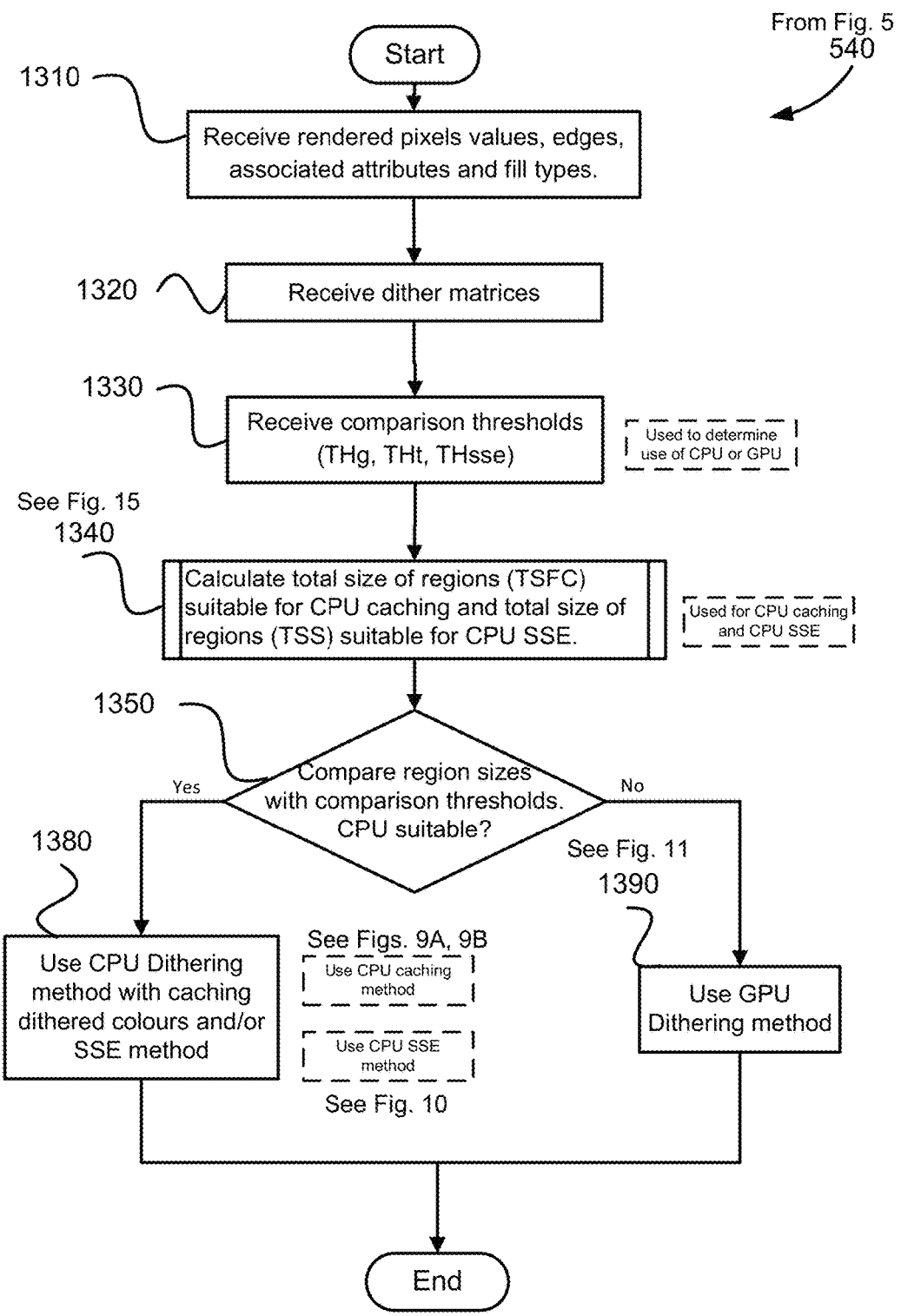
FIG. 13 is a schematic flow diagram showing one hybrid dithering method.

FIG. 11 shows a flowchart of an example of a GPU dithering method for implementing the step 1390 in FIG. 13 for a bitmap tile such as the example shown in FIG. 12A. The process depicted may be implemented by one or more of the processors 170, 105 and mainly by GPU processor 182, 301, executing one or more of the software applications 181, 133. Processing starts on CPU 105 with a step 1110 which receives input to the dithering process to be performed on a GPU 182 or 301. The input includes the pixels to be dithered (typically the output of colour conversion from the post-render process 530), a fillmap tile 1214 with edge information, fill types and attribute list, and the number of bits per pixel N for the dithered output pixel colours (e.g., 1 bit, 2 bits). The pixels to be dithered can be in a form of planar CMYK colour components as shown in the input buffers 872, 874, 876 and 878 in FIG. 8C. As shown in FIG. 12A the fillmap tile contains edges (e.g., edges 1213, 1214) and attribute types (e.g., attribute types 1243 and 1244) in an attribute list such as 1235.

Figure 12B:
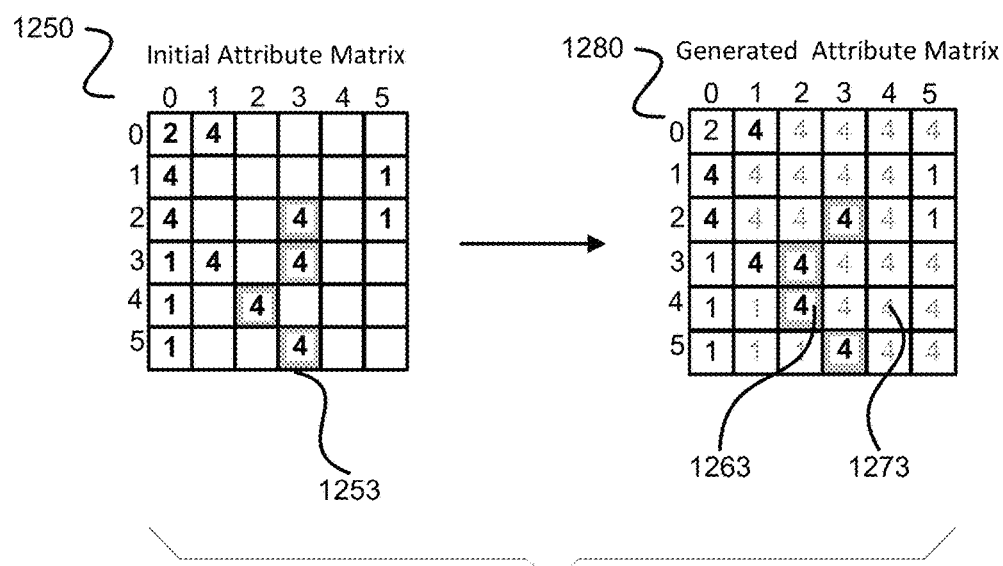

Processing continues to a step 1120 which generates in the GPU an attribute mapping matrix (e.g., 1250 in FIG. 12B) using the edge coordinates and attribute list 1235. The attribute mapping matrix has the same size as the tile and is initialised with negative one (−1) at every element of the matrix. Then, a number of threads equal to the number of edges are started in parallel to set the attribute type indices (e.g., 1243, 1244) at elements in the attribute mapping matrix corresponding to the leftmost pixel of each region for each row in the tile. These correspond to the pixels immediately to the right of each edge for each row in the tile.

When a GPU kernel (function) is launched with a number of threads, each thread is scheduled and assigned a thread index by the Thread scheduler 340 in the GPU, and executed an instance of the kernel on a processing element 310 in GPU 301. Each thread obtains an edge index (e.g., edge index 3; 1223 for edge 3; 1213) via its thread index and uses the edge index to obtain the associated attribute type index (e.g., attribute type 4; 1243 at index 3) from the attribute list 1235. Then, this attribute type (4) is stored in each element of the attribute mapping matrix that corresponds to the pixels immediately to the right of each edge for each row in the tile.

For example, the value 4 stored in shaded elements 1253 in the attribute mapping matrix indicates the attribute type for pixels in the region bordered on the left by edge 3 (i.e., 1223). Elements in the attribute mapping matrix corresponding to pixels to the right of other edges in the fillmap tile are similarly set to contain associated attribute types. The remaining elements shown empty in attribute mapping matrix 1250 in FIG. 12B have the initialised values (−1). Finally, a parallel scan-max operation can be applied on the initial attribute mapping matrix 1250 to change the value of every element containing negative one (−1) into the nearest non-negative value to its left. For example, an element 1273 in the attribute mapping matrix 1280 is set to the same attribute type value (i.e., "4") as the nearest element 1263 on its left with a non-negative value.

Parallel scan-max operation is derived from parallel prefix-sum or scan method, but with scan operator, max(x, y)=x>y?x:y and executed on GPU in parallel. The parallel algorithm for scan-max operation is more efficient when the number of comparisons is large.

The resulting attribute mapping matrix 1280 contains an attribute type index at every element indicating the attribute associated with the pixel corresponding to the element. It is easy for a dithering thread to obtain an attribute for a pixel using the pixel's coordinates. This attribute mapping matrix is similar to the attribute bitmap in some printing systems. However, an attribute bitmap is not suitable for compact fillmap tile representation where the attribute type is associated with an edge instead of each pixel. In the HD GPU dithering method, the attribute mapping matrix or attribute bitmap is generated on demand using GPU parallel algorithms.

Processing then proceeds to a step 1130 which maps or copies dither matrices to GPU memory if they are not already present there. If a GPU has shared memory with the CPU, the dither matrices on the CPU can be mapped to the GPU. If a GPU is on a discrete card, the dither matrices need to be transferred or copied to the GPU. As the dithering process 1390 in FIG. 13 is directed to a tile, all dither matrices will preferably be mapped or copied only once, either before the GPU dithering starts, or at the time of processing the first tile.

Upon completion of the step 1130, the data required for dithering are in place. Thus, the processing continues to a step 1140 where a number of threads are configured and four dithering kernels are launched, each of which dithers pixels in one colour component, e.g., cyan, magenta, yellow or black. The number of threads depends on the number of bits per component in the dithered output colour, and on the number of bytes required by the GPU for efficient memory access operations. For example, if the output requires 1 bit per colour component, dithering eight (8) pixels will make one byte of an output colour component. Thus every thread is required to dither 8 colour components to make an efficient memory write operation (one byte write) of the output colours to the global memory of the GPU. Furthermore, every GPU specifies a data alignment in accessing global memory. On most GPUs, the size of data must be aligned to $2^n$ (power of two) bytes. For example, one 2-byte write is usually more efficient than one 1-byte write. In such a case, it is preferable that every thread dither 16 colour components and store the output bits in a 2-byte integer in a private memory (which is usually faster than global memory). The 2-byte output (16 bits) is then copied to the global memory. The number of threads can be calculated as the total number of pixels to be computed at a time (e.g., one fillmap tile), divided by the number of bits in the number of bytes required for efficient memory access, and multiplied by the number of bits per output colour component. For example, if the total number of pixels in a tile is 128×128, 2-byte aligned data has 16 bits, and the number of bits per output colour component is 2, then the number of threads is 128×128÷16×2=2048.

Once the dithering kernel is launched, processing continues to a group of steps 1150 in which the GPU executes dithering of pixels for each colour component one after another. Firstly, a number of threads as determined in the step 1140 (e.g., 2048 threads) will be executed in parallel by the steps 1150 to dither all pixels in a tile in cyan. Then the same number of threads will be executed for dithering pixels in magenta, and so on. Each thread at the step 1150 dithers a group of pixels in one colour component. For each CMYK colour component, a thread iterates over every pixel in the group of pixels assigned to the thread. Using the thread index and the iteration count, the pixel position (x, y) can be calculated. Then, the pixel colour component and pixel's associated attribute index can be obtained via the attribute mapping matrix 1280. Further, the corresponding dither matrix is used to fetch the threshold to be compared with the pixel colour component. The result of the comparison needs to be shifted to the corresponding position in a temporary output memory (e.g., a 16-bit integer). When all pixels in the group assigned to the thread have been dithered, the temporary output data is copied to the corresponding output buffer for the dithered colour components in the global memory of the GPU.

If the number of output bits per colour component is greater than one, comparisons with thresholds from multiple dither matrices are required.

Alternatively, the step 1140 launches one GPU kernel with the same number of threads as described previously (e.g., 2048). Each thread dithers a group of pixels in four colour components. It is preferable to wait for all pixels dithered in one colour component to be completed before start dithering pixels for next colour component, so that writing all dithered pixels to the output buffer one after another allows GPU coalescing memory access which is more efficient. "Coalesced memory access" refers to combining multiple memory accesses into a single transaction. For example, if a GPU executes 32 consecutive threads in parallel in a single transaction and each thread accesses one single precision data (4 bytes), 32 consecutive data (128 bytes) can be accessed by 32 consecutive threads. This memory access is sequential and aligned to the GPU memory address (every 128 bytes). Thus, it is a coalesced memory access.

If there are multiple GPUs available for the dithering process, the dithering kernel is launched to each GPU, and the kernel may be with different number of threads depending on the processing capability of the GPU in question. Utilisation of multiple GPUs allows more parallel processing for dithering to increase the processing performance.

Upon completion of dithering all pixels for all colour components at the step 1150, processing continues to a step 1160 where the dithered output on the GPU is mapped or copied to the CPU. The process 1590 in FIG. 11 then concludes.

The advantage of the GPU dithering method is that it does not need to analyse the spatial properties of the regions in the tile, but simply needs to access the attribute type and compare the corresponding dither matrix element for the attribute type with the pixel colour. It utilises the massively parallel cores to speed up the dithering performance. Every pixel has a corresponding attribute type in an attribute mapping matrix. However, each pixel is independent, even with respect to nearby pixels from the same fillmap region, and the comparison for the pixel must be carried out repeatedly.

Hybrid Dithering Method

A hybrid method is disclosed for maximising the dithering performance by choosing an appropriate CPU or GPU processor for tiles with different spatial properties and associated region attributes.

FIG. 13 shows a flowchart for an example of a method 540 of dithering a fillmap tile. The depicted method may be implemented by one or more of the processors 170, 105, 182, 301, executing one or more of the software applications 181, 133. The method 540 begins at a step 1510 where the pixels to be dithered, fillmap edges and fill types associated with each edge, an attribute list for the edges, and a table of attribute types are received by the CPU. Pixel data are usually split into CMYK colour components after the colour conversion in the post-render process 530. Attribute types are represented by indices 755 into the table 750 of attribute types. An attribute list with the number of entries equal to the number of edges can be used to relate edge indices to region attributes. For example, in FIG. 6C, the last element 640 in the attribute list 635 contains an attribute type 2 associated with the edge 4 (i.e., 624). The attribute type is used to fetch a set of dither matrices for dithering. If the attribute type is graphics or text, then the fill type associated with an edge is required to further indicate whether the pixels in the region have a flat colour or gradient colours. For example, if a region is to be filled with a flat colour, all pixels in the corresponding region have the same colour. If a region is to be filled with a colour gradient, the pixel colours in the region are different and are rendered using a formula to calculate each pixel colour according to its coordinates and the gradient description.

The fill type associated with an edge is used for rendering, but is also commonly used as a hint for the type of dithering to be performed. The advantage of using the attribute list and the fill types associated with an edge is that there is no need to describe individually every pixel in the region. Thus, the rendering process 520 does not need to produce an attribute bitmap that correspond to every pixel in the rendered pixel buffer. It avoids the necessity for an attribute bitmap when dithering a rendered fillmap as is typically required by prior art halftoning techniques.

The process 540 proceeds to a next step 1520 where the dither matrices for all referenced attribute types are received by the CPU. Usually, all dither matrices for all attribute types are loaded when the rendering application 520 is started. For 1-bit per output colour component, every attribute has four dither matrices, one for each of cyan, magenta, yellow and black colour components. If there are more bits per output colour component, or more colour channels in a printer, more dither matrices are required.

Processing continues to a subsequent receiving step 1530 where a set of comparison thresholds are received. The disclosed Hybrid Dithering method determines which tile should be rendered on a CPU and which one on a GPU. In this hybrid dithering method, the actual dithering time of a tile using one method is not directly compared with that of another method. Instead, a prediction model is used to compare statistics based on properties of regions in a tile as disclosed below with predetermined comparison thresholds. The comparison thresholds Thg, Tht, and Thsse received in the step 1530 are estimated from this prediction model, and are described in more detail with reference to FIG. 14A and FIG. 14B.

Figure 14A:
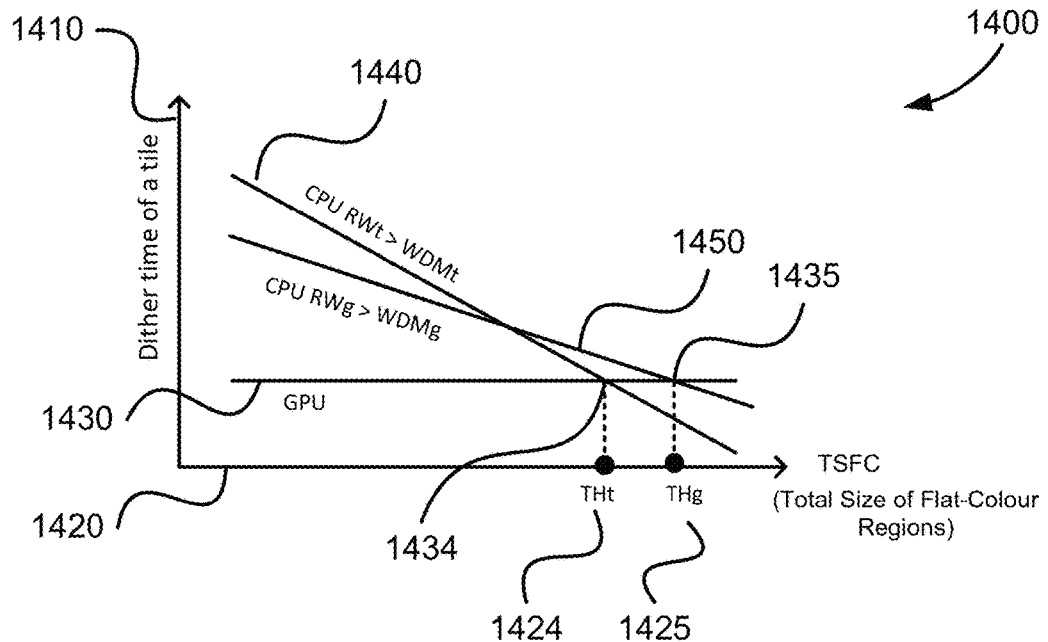
FIG. 14A shows an example of a prediction model for CPU caching method and GPU method of dithering.
Figure 14B:
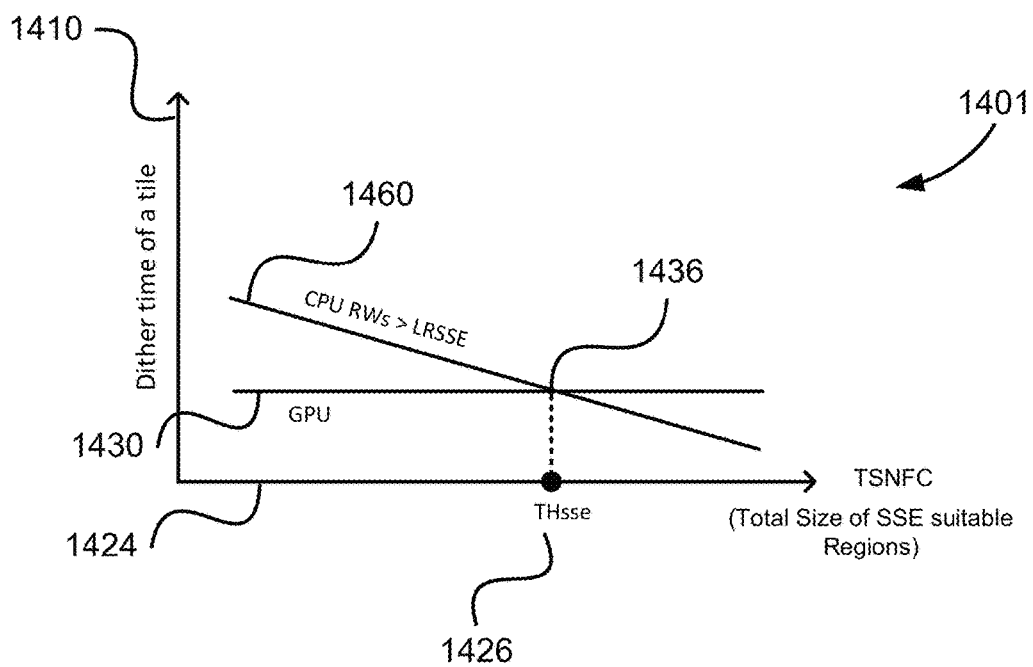
FIG. 14B shows an example of a prediction model for CPU SSE method and GPU method of dithering.

FIG. 14A and FIG. 14B show examples of the prediction models used in this HD arrangement. Experimental results of dithering tiles with certain spatial properties by both CPU and GPU methods are collected. The correlations between the spatial properties such as region's width and size, and the dithering time are established. The size of a region can, in one HD example, be defined as the number of pixels in the region.

FIG. 14A shows a line graph 1400 of dithering times of the CPU caching method depicted in FIGS. 9A and 9B and of the GPU dithering method (see FIG. 11). The y-axis 1610 represents dithering time of a tile while the x-axis 1420 is for the total size of flat colour regions (TSFC) in a tile. TSFC may be also represented as percentage of the tile size. Dithering time 1430 with the GPU method is basically constant regardless of changes in the total size of flat colour regions. Dithering times with CPU caching for text 1440 and for graphics 1450 differ due to the sizes of the dither matrices and number of comparisons when caching the dithered colours. The more total region size that can be dithered using cached dithered colours, the less dithering time is required. The intersections 1434 and 1435 of the GPU dithering time graph (i.e. the GPU dithering performance curve) 1430 and the CPU dithering time graphs (i.e. the CPU dithering performance curve) 1440 and 1450 depict a decision point (i.e. a threshold) at which point the GPU method performs better (i.e., takes less time) than the CPU caching method. Accordingly, the thresholds THt (i.e., 1424) and THg (i.e., 1425) are the comparison thresholds of the total area of the flat colour regions for predicting the dithering times and selection of CPU or GPU method. If several regions in a tile have flat colours and the total size of these regions is greater than a threshold THg or THt (text colour is flat), the CPU caching method is suitable for dithering the tile. Otherwise, the GPU method should be used.

Note that the CPU dithering time graphs in FIG. 14A are for tiles with flat colour regions whose average width is greater than the width of corresponding dither matrix, i.e., the average width RWt of a region with text attribute is greater than the width WDMt of the dither matrix for text. RWt is illustrated by an arrow 605 in FIG. 6B, where the arrow depicts the average width RWt of the region 661. TSFC on the x-axis is the total area of those regions whose average width is greater than the dither matrix's width.

Multiple colours from a row in the dithered colour pattern 980 are copied to the output buffer of the dithering process 970 if the width of every row of the region is greater than the width of a dither matrix (e.g., RWt>WDMt, or RWg>WDMg). However, the average width of the region is used in the prediction model in FIG. 14A to minimise the comparison time of width of each row with the width of the dither matrix.

In another HD arrangement, the narrow regions can be also considered for the total size of the flat colour regions (TSFC). Thus, single colour copying from the dithered colour pattern to the output buffer will be more frequent and requires more time than multiple colour copying.

FIG. 14B shows a line graph 1401 showing dithering times with the CPU SSE method. The x-axis 1424 represents the total size TSS of regions in a tile that are suitable for SSE dithering. A region is considered to be suitable for dithering on CPU with SSE if its width at least matches capacity of the SSE registers. For example, if the SSE register fits 128 bits, for a region to be suitable it needs to have at least 16 contiguous pixels having the same attribute type. This size is calculated from regions where their average width RWs is greater than the number of pixels dithered in parallel using the SSE wide register. These regions do not include the total area of the flat colour regions TSFC. In other HD implementations, they can include TSFC so that every region is considered for CPU SSE method. If the SSE register's length is LRsse, e.g., 128 bits, and each colour component has 8 bits per pixel, the number of colour components NCCsse dithered in parallel using SSE equals LRsse divided by 8 (e.g., 128÷8=16). There will be one SSE instruction performing 16 comparison operations at one time after 16 colour components are loaded into one SSE register and 16 thresholds from corresponding dither matrix are loaded into another SSE register.

If adjacent regions to the right of the current processed region have the same attribute, they are merged into one region whose average width is used for comparison with LRsse. The dithering time with the SSE method is illustrated in FIG. 14B as the graph 1460. The intersection 1436 of the CPU SSE dithering time graph and the GPU dithering time graph depicts the decision point for the hybrid dithering method. A comparison threshold THsse (i.e., 1426) is used for deciding between dithering with the CPU SSE method or the GPU method.

Returning to FIG. 13, upon completion of the step 1330 receiving comparison thresholds such as THg, THt, THsse, and LRsse, the process 540 proceeds to a step 1340 where the total size TSFC of flat colour regions that are suitable for CPU caching method and the total size TSNFC of regions that are suitable for CPU SSE are determined, as described hereinafter in more detail with reference to FIG. 15.

The process 540 continues to a decision step 1350 where the total sizes of regions TSFC and TSS that are suitable for CPU caching and CPU SSE method respectively are compared with the thresholds THt, THg and THsse. If TSFC>THt or TSFC>THg, the CPU caching method is used. If TSS>THsse, the process 540 follows a YES arrow to a step 1380 in which the CPU SSE method is used. While individual comparisons can be performed, combination of the comparisons and alternative comparison expressions can be also applied in this step. For example, a simple expression of the total of regions calculated at step 1340 (TSFCg+TSFCt+TSS) can be used to compare with a threshold to decide whether CPU or GPU processor is appropriate for a particular tile. If the comparison indicates the CPU is suitable for dithering, process 540 proceeds to step 1380 where CPU dithering is used. Otherwise, the process 540 follows a NO arrow to a step 1390 where the GPU dithering method (see FIG. 11) is utilised.

CPU dithering is performed in the step 1380 where each region is processed. If a region has a flat colour fill and its average width greater is greater than the width of its corresponding dither matrix, the CPU caching method (whose prediction model is depicted in FIG. 14A) is applied. If a region has a non-flat colour fill and its average width greater is greater than the width of the SSE register, the CPU SSE method as depicted in FIG. 14B is used. Otherwise, a pixel in a region is dithered individually. Alternatively, dithering a tile can be performed scan line by scan line. Each pixel span in a scan line can be compared with the width of the dither matrix or with the width of the SSE register, and then dithered using CPU caching method, or SSE method, or individual pixel dithering.

Upon completion of the CPU dithering step 1380 or the GPU dithering step 1390, the HD hybrid method for dithering a tile 540 concludes.

The step 1340 which determines the region sizes for comparing with pre-determined thresholds will now be described in more detail with reference to FIG. 15 and FIGS. 16A and 16B.

Figure 15:
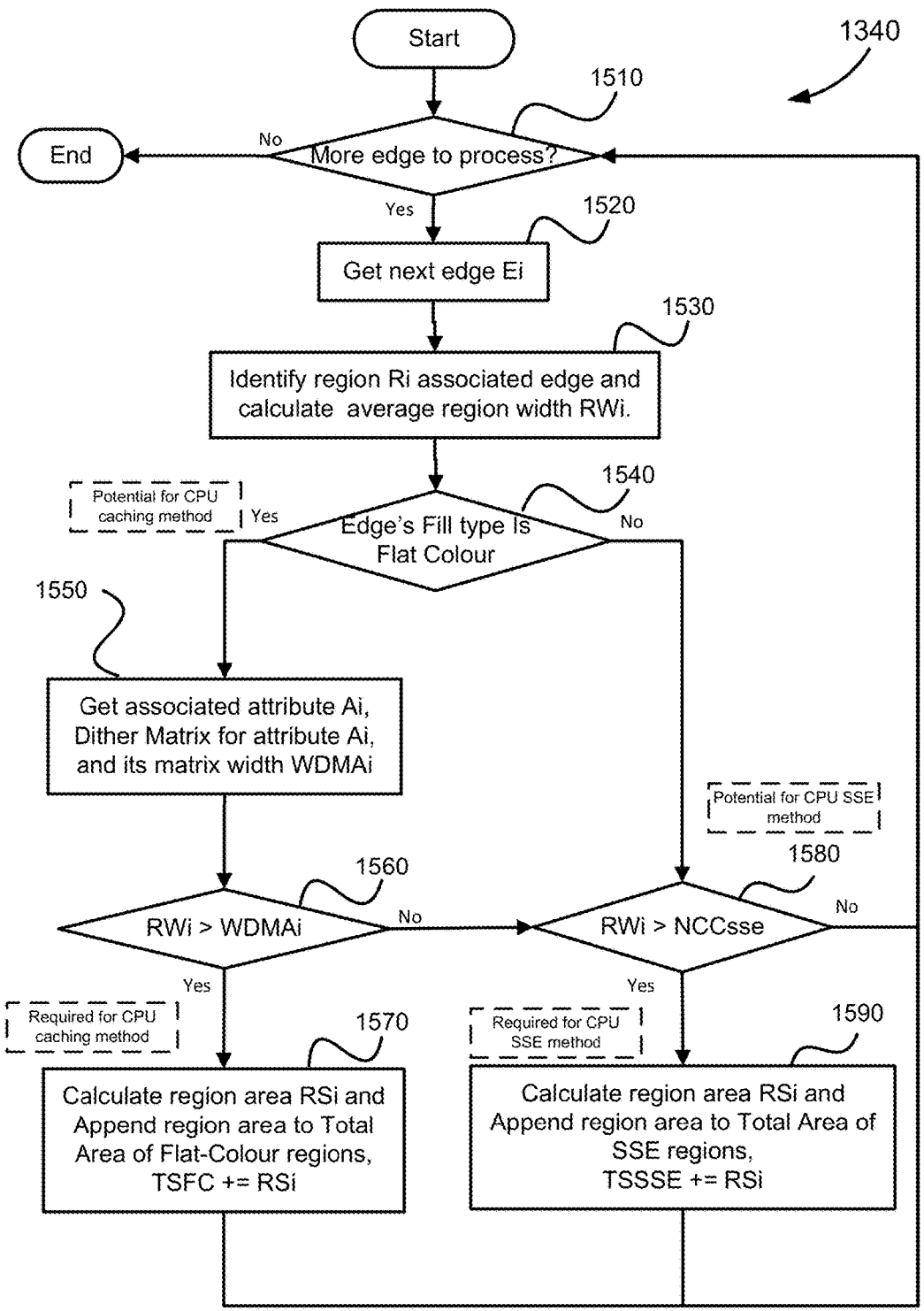
FIG. 15 is a schematic flow diagram showing one method of calculating region sizes in a tile for determining a dithering method.
Figure 16A:
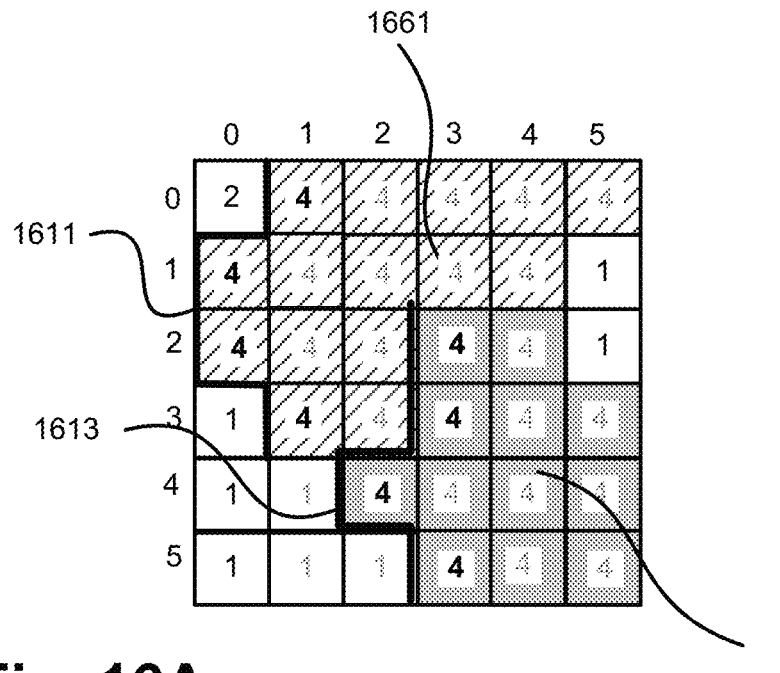
FIGS. 16A and 16B shows an example of an attribute matrix before and after region merging.
Figure 16B:
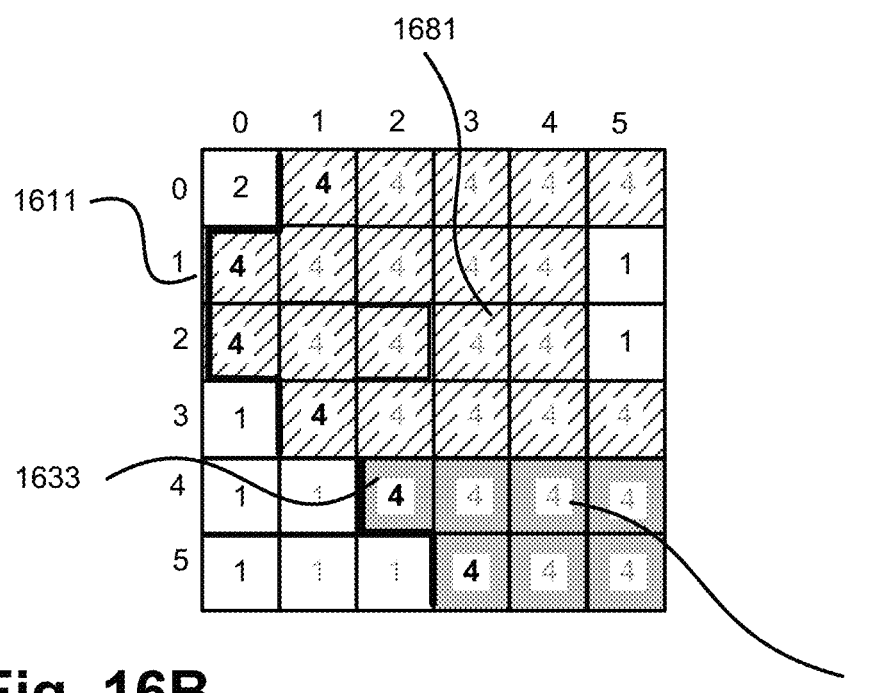

FIG. 15 shows a flow chart on an example of a method for performing the step 1340. The method depicted may be implemented by one or more of the processors 170, 105, executing one or more of the software applications 181, 133. The step 1340 in FIG. 15 starts at a decision step 1510 where it determines whether any more edges are to be processed in the fillmap tile. If there is an edge to process, the process 1340 follows a YES arrow and processing proceeds to a step 1520 which obtains the coordinates of the edge and its associated fill type. A current processed edge Ei (e.g., the edge 611 which is also shown as an edge 1611 in FIG. 16A) is identified by an edge index, i (i.e., 621).

The process 1340 in FIG. 15 then continues to a next step 1530 where a region Ri with the current edge as the left boundary is identified. The edge 1611 in FIG. 16A has a sequence of coordinates (1, 0), (0, 1), (0, 2) and (1, 3) which define the left boundary of a region R1 (i.e., 1661). The coordinates of the right boundary of this region consist of either the previous pixel position of the next edge to the right or the last pixel on the scan line. In the example of region R1 (i.e., 1661), they are (5, 0), (4, 1), (2, 2) and (2, 3). At this step, an average width RWi of the region of the current edge Ei is also calculated. For region R1 (i.e., 1661), the average width of the region RW1 is 3.75 pixels ((5+5+3+2)÷4).

Processing then proceeds to another decision step 1540 where the fill type associated with region Ri is checked. If the fill type is a flat colour, then there is a potential for use of the CPU caching method for dithering. Thus, processing follows a YES arrow and continues to a step 1550 where the attribute Ai (also referred to as the attribute type Ai) associated with the current region and its dither matrix's width WDMAi are obtained. The attribute Ai can be a text attribute type, denoted as "t", or a graphics attribute type as "g", and the width of the dither matrix is denoted as WDMt or WDMg, respectively. At the step 1540, if the fill type is not flat colour, processing follows a NO arrow, and continues to a step 1580.

Upon completion of the step 1550, processing proceeds to a step 1560 where the average width of the current region RWi is compared with the width WDMAi of the dither matrix associated with the current region's attribute. For example, RWi is compared with WDMt if the attribute of the current edge indicates that the region is a text region. If RWi is greater than WDMAi, the process 1340 in FIG. 15 follows a YES arrow and proceeds to a step 1570 where spatial properties of the tile are obtained as required by the CPU caching method (see FIG. 14A for the prediction model). In this event the region is a wide area of flat colour that will benefit from the use of dithering pattern caching. Otherwise, the process follows a NO arrow and continues to a step 1580 for further determination of whether to use the CPU SSE method.

At the step 1570, the current region's area or size is calculated, denoted RSi, and it is appended to an accumulated total area of regions for the same attribute type to combine the regions. For example, if the attribute of the current edge is text, i.e., Ai is text, the current region area RSi is appended to the Total Size for Flat Colour region, TSFCt, where the last letter "t" is for attribute "text". When the total size of the flat colour exceeds a certain proportion of the tile area, the CPU caching method (see FIG. 14A for the prediction model) is considered. This proportion is characterised by the comparison thresholds THt (i.e., 1424) and THg (i.e., 1425), which are referred to in the step 1330 for receiving comparison thresholds.

Upon completion of the step 1570, processing returns to the decision step 1510 to continue processing further edges in the fillmap tile.

At the step 1580, a region which is not suitable for the CPU caching method is checked for suitability for CPU SSE dithering. This determination step compares the average region width RWi with the number of colour components processed in an SSE operation, NCCsse. If RWi is greater than NCCsse, processing follows a YES arrow and continues to a step 1590 where the current region's size is determined, and this is appended to an accumulated total area of regions having non-flat colours and that are suitable for CPU SSE method. The more pixel spans that can be dithered using the SSE operations, the better performance can be achieved. Otherwise, the process follows a NO arrow and returns to the step 1510 to process the next edge, as the current region is considered too small for either CPU caching or SSE method.

At the step 1510, if there are no more edges to process, the process 1340 in FIG. 15 concludes.

In an alternative HD arrangement, in the step 1590, the current region is merged (i.e., appended) with adjacent regions that share the same attribute. When regions have the same attributes, the same set of dither matrices can be used to dither the pixels in these regions. Thus, these regions can be merged into one region that might be big enough to use the SSE method efficiently. For example in FIG. 16A, region R1 (i.e., 1661) and region R3 (i.e., 1663) are defined by edge 1611 and 1613, respectively. As the edge 3 (i.e., 1613) has the same attribute type 4 as edge 1's attribute (also 4), first two rows of region 3 (i.e., 1663) are merged with region 1 into a region 1681 in FIG. 16B. Edge 3 (i.e., 1613) becomes a shorter edge 1633 (marked with a highlighted letter 4 in the last two rows) and the corresponding region 1683 in FIG. 16B is also smaller. However, the average width of region 1 is changed from 3.75 to 5 pixels, while the average width of region 3 is changed from 3 to 3.5 pixels. The wider width of the region might increase the chance of using the CPU SSE method. The merging process may be performed before the step 1580. Thus, the average width of the merged region is used for comparison at the step 1580 and the calculated region size is also for the merged region.

Extensions

The HD hybrid dither process described in relation to FIG. 13 dithers a tile using either a CPU or a GPU. In an alternative HD arrangement, the dithering method 540 can be used to dither some regions of a tile on the CPU and other regions on the GPU.

In yet another alternative HD arrangement, a group of tiles can be dithered together on the CPU or GPU, especially when each tile has one edge and all tiles in the group have the same attribute, such as a couple of adjacent tiles referring to the same image.

In FIG. 5, the fillmap renderer module 403 iterates over each tile to render, post-render and dither. In a heterogeneous system when CPU and GPUs are present, the tile renderer process 520 can be performed on the CPU or the GPU. If the GPU is on a discrete card however, any data transfer between the CPU and the GPU could slow down the overall rendering time. Thus, in this case it is preferred that the post-rendering 530 and the dithering 540 processes are also performed on the GPU.

However, if the CPU and the GPU are on the same motherboard, or integrated on a chip, there are shared memories for the CPU and the GPU, and therefore, the data transfer between the CPU and GPU is considerably shorter than when the GPU is on the discrete card.

Possible configurations of tile rendering and dithering on the CPU and the GPU are listed below:
(a) render on CPU and dither on CPU;
(b) render on GPU and dither on GPU;
(c) render on GPU and dither on CPU; or
(d) render on CPU and dither on GPU.

Options (a) and (b) are preferable in an HD heterogeneous system with the GPU on a discrete card, while (c) and (d) can be practiced on an integrated CPU and GPU system.

Whether a tile is rendered on a CPU or GPU depends not only on the number of edges in a tile and edge distribution but also on the fill types associated with the edges occurring in the tile. For example, tiles with image fill and gradient fill are best rendered on a GPU because each pixel colour needs to be calculated. However, this tile might not be efficient to dither on the GPU. For the same example, tiles with one image and one gradient fill are best dithered on the CPU using the SSE optimisation. Thus, option (c) is preferably utilised for GPU rendering and CPU dithering. If there are many edges with flat colours it is better in most cases to use the CPU rendering method. However, if the widths of the flat colour regions are shorter than the width of dither matrix, it is not efficient to use the CPU caching method for dithering. Thus, GPU dithering method (e.g., see FIG. 11) is preferable. This is option (d).

Although there is in each case a best mode for a rendering or dithering task executed on a processor (CPU or GPU), the final distribution of the task to a selected processor also depends on the workload of the CPU and the GPU at the time. To ensure a balanced workload over the HD heterogeneous system, even if a tile can be rendered faster on a GPU, it might be preferable to render it on the CPU, because at that time the CPU is idle. Alternatively, a tile which is faster to dither on GPU might be dithered on CPU for similar reasons.

In FIG. 14A and FIG. 14B, comparison thresholds THt, THg and THsse are pre-determined through benchmarks of dithering times of tiles under certain CPU or GPU hardware specifications. However, the printing system 115 might be installed on a different hardware configuration. In such cases, a dynamic prediction model for determining the thresholds for the specific heterogeneous system can be implemented. The thresholds can then be updated according to the parameters from the current hardware configurations, and actual dithering times for real tiles.

In yet another HD arrangement, combining different dither matrices in a wide register of SSE can be performed. In such an HD arrangement, the preparation time for SSE dithering might take longer, and different benchmarks of dithering times could be collected. Consequently, different comparison thresholds would be obtained.

In yet another HD arrangement, the average width of the region, the size of the region, the total size of flat colour regions TSFC and the total size of SSE suitable regions can be determined during the fillmap builder 401 step and embedded in the fillmap 402. In such an arrangement, the step 1540 would not be required and the dithering performance would typically be increased.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive. Accordingly, although the description is directed primarily to region-based intermediate representations of images in the form of fillmaps having edges and fills, other region-based intermediate representations can also be processed using the disclosed arrangements.

The invention claimed is:
1. A method of dithering pixels of a graphical representation, the method comprising the steps of:
receiving the graphical representation subdivided into a plurality of portions, each portion comprising a plurality of regions, each region being associated with an attribute type corresponding to content of the region;
combining adjacently located regions associated with a same predetermined attribute type within a portion, to form a merged region;
comparing a size of the merged region with a threshold for the predetermined attribute type to select a processor for dithering at least the merged region, the processor being selected from a plurality of processors comprising at least a central processing unit and a graphics processing unit; and
dithering pixels of the graphical representation using at least the selected processor.

2. A method of dithering pixels of a graphical representation, the method comprising the steps of:
receiving the graphical representation which comprises a plurality of regions each being characterised by an attribute type associated with content of the region;
selecting, from a plurality of processors comprising at least a central processing unit (CPU) and a graphics processing unit (GPU), at least one processor to dither pixels of the regions depending upon corresponding sizes and attribute types of the regions; and
dithering pixels of the graphical representation using the selected at least one processor.

3. The method according to claim 2, wherein the selecting step further depends upon widths of the regions.

4. The method according to claim 3, wherein the selecting step comprises:
determining thresholds based on the sizes and widths of the regions, the corresponding attribute types, and sizes of dither matrices associated with the attribute types of the regions; and
comparing the sizes of the regions with the determined thresholds to select the at least one processor as at least one of the CPU and the GPU.

5. The method according to claim 4, wherein the thresholds represent points at which GPU dither performance curves and CPU dither performance curves intersect.

6. The method according to claim 5, wherein the GPU dither performance curves and the CPU dither performance curves are dependent upon at least one of total size of flat-colour regions and total size of Single Instruction Multiple Data (SIMD) suitable regions.

7. The method according to claim 4, wherein if the regions are characterised by different attribute types, the determining step determines a plurality of thresholds, one for each attribute type.

8. The method according to claim 4, wherein prior to the comparing step the method further comprises, for each region, the steps of:
comparing an average width of a region with the width of the dither matrix associated with the attribute type of the region;
if the average width is greater that the width of the dither matrix, appending the region to an accumulated total area of other regions having the same attribute type for dithering using a selected CPU; otherwise
appending the region to an accumulated total area of other regions having non-flat colours for dithering using a CPU with enabled Single Instruction Multiple Data (SIMD) processor; and wherein:
the step of comparing the sizes of the regions with the determined thresholds to select the at least one processor comprises comparing total areas of the accumulated regions with the determined thresholds to select the at least one processor as at least one of the CPU and the GPU.

9. The method according to claim 8, wherein the step of dithering using the CPU with enabled SIMD processor comprises combining different dither matrices in a wide register of SIMD.

10. The method according to claim 8, wherein the appending step combines adjacent regions to the right of a current processed region which have the same attribute.

11. The method according claim 8, wherein the step of appending the region to an accumulation of other regions having non-flat colours for dithering using the CPU with enabled SIMD processor comprises combining adjacently located regions to produce at least one combined region, wherein the regions and associated attribute types are defined by edges in the graphical representation.

12. The method according to claim 4, wherein the step of determining thresholds is dependent upon capabilities of Single Instruction Multiple Data (SIMD) processors in the plurality of processors.

13. The method according to claim 12, wherein the capabilities of the SIMD processors comprise a maximum size of input data which is able to be processed simultaneously on the SIMD processors.

14. The method according to claim 2, wherein if the size of at least one region exceeds a predetermined threshold, the selecting step selects the CPU to dither the region; otherwise, the selecting step selects the GPU to dither the region.

15. The method according to claim 2, wherein the attribute types comprise one of text, image, graphics, and non-flat region.

16. The method according claim 2, wherein the graphical representation is a fillmap.

17. The method according to claim 2, wherein the graphical representation comprises a plurality of edges defining boundaries of graphical objects, each edge being associated with an attribute type of the corresponding graphical object.

18. An apparatus for dithering pixels of a graphical representation, the apparatus comprising:
a plurality of processors; and
a plurality of memory devices storing a plurality of software programs for directing the processors to perform a method comprising the steps of:
receiving the graphical representation which comprises a plurality of regions each being characterised by an attribute type associated with content of the region;
selecting, from a plurality of processors comprising at least a central processing unit (CPU) and a graphics processing unit (GPU), at least one processor to dither pixels of the regions depending upon corresponding sizes and attribute types of the regions; and
dithering pixels of the graphical representation using the selected at least one processor.

19. A non-transitory computer readable storage medium storing a plurality of software programs for dithering pixels of a graphical representation by directing a plurality of processors to perform a method comprising the steps of:
receiving the graphical representation which comprises a plurality of regions each being characterised by an attribute type associated with content of the region;
selecting, from a plurality of processors comprising at least a central processing unit (CPU) and a graphics processing unit (GPU), at least one processor to dither pixels of the regions depending upon corresponding sizes and attribute types of the regions; and
dithering pixels of the graphical representation using the selected at least one processor.

20. A method of dithering pixels of a graphical representation, the method comprises:
receiving a graphical representation subdivided into a plurality of tiles, each tile comprises a plurality of regions, each of which is associated with an attribute value corresponding to the content of the region;

selecting at least one tile to be dithered on a central processing unit (CPU), if the size of at least one region within the at least one selected tile exceeds a predetermined threshold;
selecting at least one further tile from the plurality of tiles to be dithered on a graphics processing unit (GPU); and
dithering pixels of the graphical representation using the CPU and the GPU.

* * * * *